United States Patent
Westerhoff et al.

(10) Patent No.: US 10,427,194 B2
(45) Date of Patent: Oct. 1, 2019

(54) MICROWAVE-ENABLED THERMAL REMEDIATION OF ORGANIC CHEMICAL CONTAMINATED SOILS USING DIELECTRIC NANOMATERIALS AS ADDITIVES

(71) Applicants: Paul K. Westerhoff, Scottsdale, AZ (US); Paul Dahlen, Tempe, AZ (US); Onur Apul, Phoenix, AZ (US)

(72) Inventors: Paul K. Westerhoff, Scottsdale, AZ (US); Paul Dahlen, Tempe, AZ (US); Onur Apul, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/719,011

(22) Filed: Sep. 28, 2017

(65) Prior Publication Data
US 2018/0085800 A1 Mar. 29, 2018

Related U.S. Application Data

(60) Provisional application No. 62/400,735, filed on Sep. 28, 2016.

(51) Int. Cl.
*B09C 1/06* (2006.01)
*B09C 1/08* (2006.01)
*B09C 1/00* (2006.01)

(52) U.S. Cl.
CPC ............. *B09C 1/06* (2013.01); *B09C 1/00* (2013.01); *B09C 1/08* (2013.01); *B09C 2101/00* (2013.01)

(58) Field of Classification Search
CPC ................ B09C 1/00; B09C 1/06; B09C 1/08
(Continued)

(56) References Cited

U.S. PATENT DOCUMENTS 4,631,380 A * 12/1986 Tran .................... A22C 11/006
                                                    219/697
5,449,889 A *  9/1995 Samardzija ............ A01M 1/06
                                                    166/248
(Continued)

FOREIGN PATENT DOCUMENTS

WO    2007133807 A2    11/2007
WO    2008005509 A2    1/2008
(Continued)

OTHER PUBLICATIONS

O.G. Apul et. al, Treatment of heavy, long-chain petroleum-hydrocarbon impacted soils using chemical oxidation, 142 J. Environ. Eng. 12 (2016), 04016065-1-04016065-8.
(Continued)

*Primary Examiner* — Tara Mayo-Pinnock
(74) *Attorney, Agent, or Firm* — Fish & Richardson P.C.

(57) ABSTRACT

A soil remediation method for treating contaminated soil includes combining a dielectric carbonaceous nanomaterial with the contaminated soil to yield a composite contaminated soil, and irradiating the composite contaminated soil with microwave radiation to yield a remediated soil. The composite contaminated soil includes at least 1 wt % of the dielectric carbonaceous material, and the microwave radiation provides an energy input of at least 2.5 kWh per kilogram of the composite contaminated soil.

12 Claims, 8 Drawing Sheets

(58) Field of Classification Search
USPC .................. 405/128.1–128.6, 128.7–128.9
See application file for complete search history.

(56) References Cited

U.S. PATENT DOCUMENTS

| | | | | |
|---|---|---|---|---|
| 5,968,400 | A * | 10/1999 | Wicks .................. | A61L 11/00 219/679 |
| 6,857,998 | B1 * | 2/2005 | Slattery ................ | A62D 3/33 405/128.75 |
| 7,963,720 | B2 | 6/2011 | Hoag et al. | |
| 9,878,320 | B2 | 1/2018 | Hristovski et al. | |
| 2014/0079592 | A1 | 3/2014 | Chang et al. | |

FOREIGN PATENT DOCUMENTS

| | | | |
|---|---|---|---|
| WO | 2012109768 A1 | 8/2012 | |
| WO | 2012155269 A1 | 11/2012 | |
| WO | 2012162840 A1 | 12/2012 | |
| WO | 2013188979 A1 | 12/2013 | |
| WO | 2015147939 A1 | 10/2015 | |
| WO | WO-2017035669 A1 * | 3/2017 | ............. B01D 5/006 |
| WO | 2018073782 A1 | 4/2018 | |

OTHER PUBLICATIONS

T. Chen et. al., Ozone enhances the bioavailability of heavy hydrocarbons in soil, 11 J. Environ. Eng. Sci. 7-17 (2016).
A.G. Delgado et al., Successful operation of continuous reactors at short retention times results in high density, fast-rate Dehalococcoides dechlorinating cultures, 98 Appl. Microbiol. Biotechnol. 2729-37 (2014).
Aguirre, "Breakthrough Invention Will Increase Biogas Fuel Production From Wastewater Sludge" Engineering Solutions, 2018, 2 pages.
Apul et al., "Ultrasonic pretreatment and subsequent anaerobic digestion under different operational conditions" Bioresource Technology 101, 2010, pp. 8984-8992.
Ziv-El, M. et al., "Development and characterization of DehaloR2, a novel anaerobic microbial consortium performing rapid dechlorination of TCE to ethene", Applied Microbiology and Biotechnology, Dec. 2011, vol. 92, No. 5, pp. 1063-1071 <DOI:10.1007/s00253-011-3388-y>.
Ziv-El, M. et al., "Managing methanogens and homoacetogens to promote reductive dechlorination of trichloroethene with direct delivery of H2 in a membrane biofilm reactor", Biotechnology and Bioengineering, Sep. 2012, vol. 109, No. 9, pp. 2200-2210 <DOI:10.1002/bit.24487>.
Ziv-El, M. et al., "Using Electron Balances and Molecular Techniques to Assess Trichoroethene-Induced Shifts to a Dechlorinating Microbial Community", Biotechnology and Bioengineering, Sep. 2012, vol. 109, No. 9, pp. 2230-2239 <DOI:10.1002/bit.24504>.
Abramovitch, R. et al., "In situ remediation of soils contaminated with toxic metal ions using microwave energy", Chemosphere, Dec. 2003, vol. 53, No. 9, pp. 1077-1085 <DOI:10.1016/S0045-6535(03)00572-1>.
Achugasim, O. et al., "Potassium permanganate as an oxidant in the remediation of soils polluted by Bonny light crude oil", Journal of Soil Science and Environmental Management, Feb. 2014, vol. 3, No. 2, pp. 4-19.
Adams, C. et al., "Effects of ozonation on the biodegradability of substituted phenols", Water Research, Oct. 1997, vol. 31, No. 10, pp. 2655-2663 <DOI:10.1016/S0043-1354(97)00114-0>.
Adebusoye, S. et al., "Microbial degradation of petroleum hydrocarbons in a polluted tropical stream", World Journal of Microbiology and Biotechnology, Aug. 2007, vol. 23, No. 8, pp. 1149-1159 <DOI:10.1007/s11274-007-9345-3>.
Adeniyi, A. et al., "Determination of total petroleum hydrocarbons and heavy metals in soils within the vicinity of facilities handling refined petroleum products in Lagos metropolis", Environment International, Apr. 2002, vol. 28, No. 1-2, pp. 79-82 <DOI:10.1016/S0160-4120(02)00007-7>.
Aeppli, C. et al., "Recalcitrance and degradation of petroleum biomarkers upon abiotic and biotic natural weathering of Deepwater Horizon oil", Environmental Science & Technology, May 2014, vol. 48, No. 12, pp. 6726-6734 <DOI:10.1021/es500825q>.
Agency for Toxic Substances and Disease Registry (ATSDR)., "2011 ATSDR Substance Priority List", U.S. Department of Health & Human Services, 2011 [retrieved on Apr. 30, 2019 from atsdr.cdc.gov], retrieved from the internet: <URL:https://www.atsdr.cdc.gov/spl/resources/2011_atsdr_substance_priority_list.html>.
Ahn, Y. et al., "Monitoring of petroleum hydrocarbon degradative potential of indigenous microorganisms in ozonated soil", Biodegradation, Feb. 2005, vol. 16, No. 1, pp. 45-56 <DOI:10.1007/s10531-004-0428-2>.
Al, Z. et al., "Microwave-induced Catalytic Oxidation of RhB by a Nanocomposite of Fe@Fe2O3 Core-Shell Nanowires and Carbon Nanotubes", The Journal of Physical Chemistry, Jun. 2008, vol. 112, No. 26, pp. 9847-9853 <DOI:10.1021/jp801950r>.
Alinnor, I. et al., "Determination of total petroleum hydrocarbon in soil and groundwater samples in some communities in Rivers State, Nigeria", Journal of Environmental Chemistry and Ecotoxicology, Dec. 2013, vol. 5, No. 11, pp. 292-297 <DOI:10.5897/JECE2013.0298>.
Apicella, B. et al., "Aromatic structures of carbonaceous materials and soot inferred by spectroscopic analysis", Carbon, 2004, vol. 42, No. 8-9, pp. 1583-1589 <DOI:10.1016/j.carbon.2004.02.010>.
Apul, O. et al., "Carbonaceous nano-additives augment microwave-enabled thermal remediation of soils containing petroleum hydrocarbons", Environmental Science: Nano, Aug. 2016, vol. 3, pp. 997-1002 <DOI:10.1039/C6EN00261G>.
Apul, O. et al., "Treatment of Heavy, Long-Chain Petroleum-Hydrocarbon Impacted Soils Using Chemical Oxidation", Journal of Environmental Engineering, Dec. 2016, vol. 142, No. 12, article 04016065, 8 pages <DOI:10.1061/(ASCE)EE.1943-7870.0001139>.
Aziz, C. et al., "Bioaugmentation Considerations", in: Stroo, H. et al (ed.) "Bioaugmentation for Groundwater Remediation" (New York, Springer, Jul. 2012), pp. 141-169.
Balgis, R. et al., "Synthesis and evaluation of straight and bead-free nanofibers for improved aerosol filtration", Chemical Engineering Science, Dec. 2015, vol. 137, pp. 947-954 <DOI:10.1016/j.ces.2015.07.038>.
Batchelor, G., "The stress system in a suspension of force-free particles", Journal of Fluid Mechanics, Apr. 1970, vol. 41, No. 3, pp. 545-570 <DOI:10.1017/S0022112070000745>.
Bavel, B., "Comparison of Fenton's Reagent and Ozone Oxidation of Polycyclic Aromatic Hydrocarbons in Aged Contaminated Soils (7 pp)", Journal of Soils and Sediments, Oct. 2006, vol. 6, No. 4, pp. 208-214 <DOI:10.1065/iss2006.08.179>.
Bento, F. et al., "Comparative bioremediation of soils contaminated with diesel oil by natural attenuation, biostimulation and bioaugmentation", Bioresource Technology, Jun. 2005, vol. 96, No. 9, pp. 1049-1055 <DOI:10.1016/j.biortech.2004.09.008>.
Berggren, D. et al., "Effects of Sulfate Reduction on the Bacterial Community and Kinetic Parameters of a Dechlorinating Culture under Chemostat Growth Conditions", Environmental Science & Technology, Jan. 2013, vol. 47, No. 4, pp. 1879-1886 <DOI:10.1021/es304244z>.
Bijan, L. et al., "Integrated ozone and biotreatment of pulp mill effluent and changes in biodegradability and molecular weight distribution of organic compounds", Water Research, Oct. 2005, vol. 39, No. 16, pp. 3763-3772 <DOI:10.1016/j.watres.2005.07.018>.
Bojes, H. et al., "Characterization of EPA's 16 priority pollutant polycyclic aromatic hydrocarbons (PAHs) in tank bottom solids and associated contaminated soils at oil exploration and production sites in Texas", Regulatory Toxicology and Pharmacology, Apr. 2007, vol. 47, No. 3, pp. 288-295 <DOI:10.1016/j.yrtph.2006.11.007>.
Brame, J. et al.,"Photocatalytic pre-treatment with food-grade TiO2 increases the bioavailability and bioremediation potential of weathered oil from the Deepwater Horizon oil spill in the Gulf of

(56) References Cited

OTHER PUBLICATIONS

Mexico", Chemosphere, Feb. 2013, vol. 90, No. 8, pp. 2315-2319 <DOI:10.1016/j.chemosphere.2012.10.009>.

Camel, V. et al., "The use of ozone and associated oxidation processes in drinking water treatment", Water Research, Nov. 1998, vol. 32, No. 11, pp. 3208-3222 <DOI:10.1016/S0043-1354(98)00130-4>.

Caporaso, J. et al., "QIIME allows analysis of highthroughput community sequencing data", Nature Methods, May 2010, vol. 7, No. 5, pp. 335-336 <DOI:10.1038/nmeth.f.303>.

Caporaso, J. et al., "Ultra-high-throughput microbial community analysis on the Illumina HiSeq and MiSeq platforms", The IMSE Journal, Mar. 2012, vol. 6, No. 8, pp. 1621-1624 <DOI:10.1038/ismej.2012.8>.

Carr, C. et al., "Effect of Dechlorinating Bacteria on the Longevity and Composition of PCE-Containing Nonaqueous Phase Liquids under Equilibrium Dissolution Conditions", Environmental Science & Technology, Feb. 2000, vol. 34, No. 6, pp. 1088-1094 <DOI:10.1021/es990989t>.

Caruso, R. et al., "Multilayered Titania, Silica, and Laponite Nanoparticle Coatings on Polystyrene Colloidal Templates and Resulting Inorganic Hollow Spheres", Chemistry of Materials, Jan. 2001, vol. 13, No. 2, pp. 400-409 <DOI:10.1021/cm001175a>.

Casper, C. et al., "Controlling Surface Morphology of Electrospun Polystyrene Fibers: Effect of Humidity and Molecular Weight in the Electrospinning Process", Macromolecules, 2004 (available online: Dec. 2003), vol. 37, No. 2, pp. 573-578 <DOI:10.1021/ma0351975>.

Chambon, J. et al., "Review of reactive kinetic models describing reductive dechlorination of chlorinated ethenes in soil and groundwater", Biotechnology and Bioengineering, Jan. 2013, vol. 110, No. 1, pp. 1-23 <DOI:10.1002/bit.24714>.

Chang, H. et al., "Treatment of heavy oil contaminated sand by microwave energy", Environmental Engineering Science, Dec. 2011, vol. 28, No. 12, pp. 869-873 <DOI:10.1089/ees.2010.0328>.

Chen, J. et al., "Microwave-induced carbon nanotubes catalytic degradation of organic pollutants in aqueous solution", Journal of Hazardous Materials, Jun. 2016, vol. 310, pp. 226-234 <DOI:10.1016/j.jhazmat.2016.02.049>.

Chen, T. et al., "Ozone enhances biodegradability of heavy hydrocarbons in soil", Journal of Environmental Engineering and Science, Mar. 2016, vol. 11, No. 1, pp. 7-17 <DOI:10.1680/jenes.16.00002>.

Cheng, D. et al., "Isolation and characterization of *Dehalococcoides* sp strain MB, which dechlorinates tetrachloroethene to trans-1,2-dichloroethene", Applied and Environmental Microbiology, Sep. 2009, vol. 75, No. 18, pp. 5910-5918 <DOI:10.1128/AEM.00767-09>.

Cheng, M. et al., "Hydroxyl radicals based advanced oxidation processes (AOPs) for remediation of soils contaminated with organic compounds: A review", Chemical Engineering Journal, Jan. 2016, vol. 284, pp. 582-598 <DOI:10.1016/j.cej.2015.09.001>.

Chien, H. et al., "Clean up of petroleum-hydrocarbon contaminated soils using enhanced bioremediation system: Laboratory feasibility study", Journal of Environmental Engineering, Jun. 2010, vol. 136, No. 6, pp. 597-606 <DOI:10.1061/ASCEEE.1943-7870.0000166>.

Chien, Y-C., "Field study of in situ remediation of petroleum hydrocarbon contaminated soil on site using microwave energy", Journal of Hazardous Materials, Jan. 2012, vol. 199-200, pp. 457-461 <DOI:10.1016/j.ihazmat.2011.11.012>.

Choi, H. et al., "Transport characteristics of gas phase ozone in unsaturated porous media for in-situ chemical oxidation", Journal of Contaminant Hydrology, Jul. 2002, vol. 57, No. 1-2, pp. 81-98 <DOI:10.1016/S0169-7722(01)00219-4>.

Cristescu, L. et al., "Evaluation of petroleum contaminants in soil by fluorescence spectroscopy", Environmental Engineering and Management Journal, Sep./Oct. 2009, vol. 8, No. 5, pp. 1269-1273 <DOI:10.30638/eemj.2009.186>.

Das, N. et al., "Microbial degradation of petroleum hydrocarbon contaminants: an overview", Biotechnology Research International, 2011, vol. 2011, article 941810, 13 pages <DOI:10.4061/2011/941810>.

Daugulis, A. et al., "Microbial degradation of high and low molecular weight polyaromatic hydrocarbons in a two-phase partitioning bioreactor by two strains of *Sphingomonas* sp", Biotechnology Letters, Sep. 2003, vol. 25, No. 17, pp. 1441-1444.

Deitzel, J. et al., "The effect of processing variables on the morphology of electrospun nanofibers and textiles", Polymer, Jan. 2001, vol. 42, No. 1, pp. 261-272 <DOI:10.1016/S0032-3861(00)00250-0>.

Delgado, A. et al., "Role of bicarbonate as a pH buffer and electron sink in microbial dechlorination of chloroethenes", Microbial Cell Factories, 2012, vol. 11, No. 128, 10 pages.

Delgado, A. et al., "Selective enrichment yields robust ethene-producing dechlorinating cultures from microcosms stalled at cis-dichloroethene", PLoS One, Jun. 2014, vol. 9, No. 6, article e100654, 9 pages <DOI:10.1371/journal.pone.0100654>.

Delgado, A. et al., "Successful operation of continuous reactors at short retention times results in highdensity, fast-rate Dehalococcoides dechlorinating cultures", Applied Microbiology and Biotechnology, Mar. 2014, vol. 98, No. 6, pp. 2729-2737 <DOI:10.1007/s00253-013-5263-5>.

Ding, B. et al., "Titanium dioxide nanofibers prepared by using electrospinning method", Fibers and Polymers, Jun. 2004, vol. 5, No. 2, pp. 105-109.

Divya, O. et al., "Multivariate methods on the excitation emission matrix fluorescence spectroscopic data of diesel-kerosene mixtures: A comparative study", Analytica Chimica Acta, May 2007, vol. 592, No. 1, pp. 82-90 <DOI:10.1016/j.aca.2007.03.079>.

Doshi, J. et al., "Electrospinning process and applications of electrospun fibers", Journal of Electrostatics, Aug. 1995, vol. 35, No. 2-3, pp. 151-160 <DOI:10.1016/0304-3886(95)00041-8>.

Douglas, G. et al., "Environmental stability of selected petroleum hydrocarbon source and weathering ratios", Environmental Science and Technology, Jun. 1996, vol. 30, No. 7, pp. 2332-2339 <DOI:10.1021/es950751e>.

Drzyzga, O. et al., "Coexistence of a sulphate-reducing *Desulfovibrio* species and the dehalorespiring Desulfitobacterium frappieri TCE1 in defined chemostat cultures grown with various combinations of sulphate and tetrachloroethene", Environmental Microbiology, Feb. 2001, vol. 3, No. 2, pp. 92-99.

Duhamel, M. et al., "Growth and Yields of Dechlorinators, Acetogens, and Methanogens during Reductive Dechlorination of Chlorinated Ethenes and Dihaloelimination of 1,2-Dichloroethane", Environmental Science & Technology, Mar. 2007, vol. 41, No. 7, pp. 2303-2310 <DOI:10.1021/es062010r>.

Popat, S. et al., "Kinetics and Inhibition of Reductive Dechlorination of Trichloroethene, cis-1,2-Dichloroethene and Vinyl Chloride in a Continuously Fed Anaerobic Biofilm Reactor", Environmental Science & Technology, Jan. 2011, vol. 45, No. 4, pp. 1569-1578 <DOI:10.1021/es102858t>.

Qiu, L. et al., "Formaldehyde biodegradation by immobilized *Methylobacterium* sp. XJLW cells in a three-phase fluidized bed reactor", Bioprocess and Biosystems Engineering, Jul. 2014, vol. 37, No. 7, pp. 1377-1384 <DOI:10.1007/s00449-013-1110-4>.

Ramakrishna, S. et al., "Book Review on An Introduction to Electrospinning and Nanofibers", Journal of Engineered Fibers and Fabrics, 2008, vol. 3, No. 2, pp. 46-47.

Ramaseshan, R. et al., "Nanostructured ceramics by electrospinning", Applied Physics Reviews, 2007, vol. 102, No. 111101, 17 pages <DOI:10.1063/1.2815499>.

Ranc, B. et al., "Selection of oxidant doses for in situ chemical oxidation of soils contaminated by polycyclic aromatic hydrocarbons (PAHs): A review", Journal of Hazardous Materials, Jul. 2016, vol. 312, pp. 280-297 <DOI:10.1016/j.ihazmat.2016.03.068>.

Rayner, J. et al., "Petroleum-hydrocarbon contamination and remediation by microbioventing at sub-Antarctic Macquarie Island", Cold Regions Science and Technology, May 2007, vol. 48, No. 2, pp. 139-153 <DOI:10.1016/j.coldregions.2006.11.001>.

Ritalahti, K. et al., "Quantitative PCR Targeting 16S rRNA and Reductive Dehalogenase Genes Simultaneously Monitors Multiple

(56) References Cited

OTHER PUBLICATIONS

Dehalococcoides Strains", Applied and Environmental Microbiology, Apr. 2006, vol. 72, No. 4, pp. 2765-2774 <DOI:10.1128/AEM.72.4.2765-2774.2006>.

Rittmann, B. et al., "Treatment of a colored groundwater by ozone-biofiltration: pilot studies and modeling interpretation", Water Research, Jul. 2002, vol. 36, No. 13, pp. 3387-3397 <DOI:10.1016/S0043-1354(02)00033-7>.

Russo, L. et al., "Ozone oxidation and aerobic biodegradation with spent mushroom compost for detoxification and benzo(a)pyrene removal from contaminated soil", Chemosphere, May 2012, vol. 87, No. 6, pp. 595-601 <DOI:10.1016/j.chemosphere.2012.01.012>.

Sabalowsky, A. et al., "Trichloroethene and cis-1,2-dichloroethene concentration-dependent toxicity model simulates anaerobic dechlorination at high concentrations. II: continuous flow and attached growth reactors", Biotechnology and Bioengineering, Oct. 2010, vol. 107, No. 3, pp. 540-549 <DOI:10.1002/bit.22822>.

Salam, L. et al., "Biodegradation of used engine oil by a methylotrophic bacterium, Methylobacterium mesophilicum isolated from tropical hydrocarboncontaminated soil", Petroleum Science and Technology, Dec. 2014, vol. 33, No. 2, pp. 186-195 <DOI:10.1080/10916466.2014.961610>.

Santos, E. et al., "Electric-field dependence of the effective dielectric constant in graphene", Nano Letters, Jan. 2013, vol. 13, No. 3, pp. 898-902 <DOI:10.1021/nl303611v>.

Schaefer, C. et al., "Bioaugmentation for chlorinated ethenes using *Dehalococcoides* sp.: Comparison between batch and column experiments", Chemosphere, Apr. 2009, vol. 75, No. 2, pp. 141-148 <DOI:10.1016/j.chemosphere.2008.12.041>.

Schindelin, J. et al., "Fiji: an open-source platform for biological-image analysis", Nature Methods, Jul. 2012, vol. 9, No. 7, pp. 676-682 <DOI:10.1038/nmeth.2019>.

Scott, J. et al., "Integration of chemical and biological oxidation processes for water treatment: review and recommendations", Environmental Progress, 1995, vol. 14, No. 2, pp. 88-103 <DOI:10.1002/ep.670140212>.

Steffan, R. et al., "Production and Handling of Dehalococcoides Bioaugmentation Cultures", in: Stroo, H. et al (ed.) "Bioaugmentation for Groundwater Remediation" (New York, Springer, Jul. 2012), pp. 89-115.

Su, C. et al., "Photocatalytic Process of Simultaneous Desulfurization and Denitrification of Flue Gas by TiO2-Polyacrylonitrile Nanofibers", Environmental Science & Technology, Sep. 2013, vol. 47, No. 20, pp. 11562-11568 <DOI:10.1021/es4025595>.

Sung, Y. et al., "*Geobacter lovleyi* sp. Nov. strain SZ, a novel metal-reducing and tetrachloroethenedechlorinating bacterium", Applied and Environmental Microbiology, Apr. 2006, vol. 72, No. 4, pp. 2775-2782 <DOI:10.1128/AEM.72.4.2775-2782.2006>.

Sutton, N. et al., "Impact of organic carbon and nutrients mobilized during chemical oxidation on subsequent bioremediation of a diesel-contaminated soil", Chemosphere, Feb. 2014, vol. 97, pp. 64-70 <DOI:10.1016/j.chemosphere.2013.11.005>.

Tai, C. et al., "Dechlorination and destruction of 2, 4, 6-trichlorophenol and pentachlorophenol using hydrogen peroxide as the oxidant catalyzed by molybdate ions under basic condition", Chemosphere, Apr. 2005, vol. 59, No. 3, pp. 321-326 <DOI:10.1016/j.chemosphere.2004.10.024>.

Tang, S. et al., "Functional characterization of reductive dehalogenases by using blue native polyacrylamide gel electrophoresis", Applied and Environmental Microbiology, Feb. 2013, vol. 79, No. 3, pp. 974-981 <DOI:10.1128/AEM.01873-12>.

Thavasi, V. et al., "Electrospun nanofibers in energy and environmental applications", Energy & Environmental Science, 2008, vol. 1, pp. 205-221 <DOI:10.1039/B809074M>.

Tran, D. et al., "Electrospun Zeolite/Cellulose Acetate Fibers for Ion Exchange of Pb", Fibers, Dec. 2014, vol. 2, pp. 308-317 <DOI:10.3390/fib2040308>.

Tsai, T. et al., "Enhanced bioremediation of fuel-oil contaminated soils: Laboratory feasibility study", Journal of Environmental Engineering, Sep. 2009, vol. 135, No. 9, pp. 845-853 <DOI:10.1061/(ASCE)EE.1943-7870.0000049>.

Tsai, T. et al., "Treatment of fuel-oil contaminated soils by biodegradable surfactant washing followed by Fenton-like oxidation", Journal of Environmental Engineering, Oct. 2009, vol. 135, No. 10, pp. 1015-1024 <DOI:10.1061/(ASCE)EE.1943-7870.0000052>.

Tsai, T. et al., "Treatment of petroleum-hydrocarbon contaminated soils using hydrogen peroxide oxidation catalyzed by waste basic oxygen furnace slag", Journal of Hazardous Materials, Oct. 2009, vol. 170, No. 1, pp. 466-472 <DOI:10.1016/j.jhazmat.2009.04.073>.

Tuteja, A. et al., "Multifunctional Nanocomposites with Reduced Viscosity", Macromolecules, Nov. 2007, vol. 40, No. 26, pp. 9427-9434 <DOI:10.1021/ma071313i>.

Urum, K. et al., "A comparison of the efficiency of different surfactants for removal of crude oil from contaminated sites", Chemosphere, Mar. 2006, vol. 62, No. 9, pp. 1403-1410 <DOI:10.1016/j.chemosphere.2005.05.016>.

Urum, K. et al., "Surfactants treatment of crude oil contaminated soils", Journal of Colloid and Interface Science, Aug. 2004, vol. 276, No. 2, pp. 456-464 <DOI:10.1016/j.jcis.2004.03.057>.

USEPA., "Nonhalogenated Organics Using GC/FID", United States Environmental Protection Agency, 2003, 37 pages.

Vainberg, S. et al., "Large-scale production of bacterial consortia for remediation of chlorinated solventcontaminated groundwater", Journal of Industrial Microbiology & Biotechnology, Sep. 2009, vol. 36, No. 9, pp. 1189-1197 <DOI:10.1007/s10295-009-0600-5>.

Van Aken, B. et al., Biodegradation of Nitro-Substituted Explosives 2,4,6-Trinitrotoluene, Hexahydro-1,3,5-Trinitro-1,3,5-Triazine, and Octahydro-1,3,5,7-Tetranitro-1,3,5-Tetrazocine by a phytosymbiotic *Methylobacterium* sp. Associated with Poplar Tissues (Populus deltoides nigra DN34), Applied and Environmental Microbiology, Jan. 2004, vol. 70, No. 1, pp. 508-517 <DOI:10.1128/AEM.70.1.508-517.2004>.

Van Beilen, J. et al., "Rubredoxins Involved in Alkane Oxidation", Journal of Bacteriology, Mar. 2002, vol. 184, No. 6, pp. 1722-1732 <DOI:10.1128/JB.184.6.1722-1732.2002>.

Wang, J. et al., "Compositional Changes of Hydrocarbons of Residual Oil in Contaminated Soil During Ozonation", Ozone: Science & Engineering, Oct. 2013, vol. 35, No. 5, pp. 366-374 <DOI:10.1080/01919512.2013.796859>.

Wang, Z. et al., "Oil spill identification", Journal of Chromatography A, May 1999, vol. 843, No. 1-2, pp. 369-411 <DOI:10.1016/S0021-9673(99)00120-X>.

Weissker, U. et al., "Carbon nanotubes filled with ferromagnetic materials", Materials, Aug. 2010, vol. 3, No. 8, pp. 4387-4427 <DOI:10.3390/ma3084387>.

Wu, J. et al., "Treatment of landfill leachate by ozone-based advanced oxidation processes", Chemosphere, Feb. 2004, vol. 54, No. 7, pp. 997-1003 <DOI:10.1016/j.chemosphere.2003.10.006>.

Xu, X. et al., "Biodegradable electrospun poly(1-lactide) fibers containing antibacterial silver nanoparticles", European Polymer Journal, Sep. 2006, vol. 42, No. 9, pp. 2081-2087 <DOI:10.1016/j.eurpolymj.2006.03.032>.

Yan, J. et al., "Unexpected specificity of interspecies cobamide transfer from *Geobacter* spp. to organohalide-respiring Dehalococcoides mccartyi strains", Applied and Environmental Microbiology, Sep. 2012, vol. 78, No. 18, pp. 6630-6636 <DOI:10.1128/AEM.01535-12>.

Yang, Q. et al., "Influence of Solvents on the Formation of Ultrathin Uniform Poly(vinyl pyrrolidone) Nanofibers with Electrospinning", Journal of Polymer Science Part B, Sep. 2004, vol. 42, No. 20, pp. 3721-3726 <DOI:10.1002/polb.20222>.

Yang, Y. et al., "Competition for Hydrogen within a Chlorinated Solvent Dehalogenating Anaerobic Mixed Culture", Environmental Science & Technology, Sep. 1998, vol. 32, No. 22, pp. 3591-3597 <DOI:10.1021/es980363n>.

Yen, C-H. et al., "Application of persulfate to remediate petroleum hydrocarboncontaminated soil: Feasibility and comparison with common oxidants", Journal of Hazardous Materials, Feb. 2011, vol. 186, No. 2-3, pp. 2097-2102 <DOI:10.1016/j.jhazmat.2010.12.129>.

(56) References Cited

OTHER PUBLICATIONS

Young, R. et al., "Aerobic Biodegradation of 2,2-Dithiodibenzoic Acid Produced from Dibenzothiophene Metabolites", Applied and Environmental Microbiology, Jan. 2006, vol. 72, No. 1, pp. 491-496 <DOI:10.1128/AEM.72.1.491-496.2006>.

Yu, D-Y. et al., "Characteristics in oxidative degradation by ozone for saturated hydrocarbons in soil contaminated with diesel fuel", Chemosphere, Jan. 2007, vol. 66, No. 5, pp. 799-807 <DOI:10.1016/j.chemosphere.2006.06.053>.

Yu, S. et al., "Kinetics and Inhibition of Reductive Dechlorination of Chlorinated Ethylenes by Two Different Mixed Cultures", Environmental Science & Technology, 2005 (available online Dec. 2004), vol. 39, No. 1, pp. 195-205 <DOI:10.1021/es0496773>.

Yuan, S. et al., "Microwave remediation of soil contaminated with hexachlorobenzene", Journal of Hazardous Materials, Sep. 2006, vol. B137, No. 2, pp. 878-885 <DOI:10.1016/j.jhazmat.2006.03.005>.

Zeng, Y. et al., "Integrated Chemical-Biological Treatment of Benzo[a]pyrene", Environmental Science & Technology, Feb. 2000, vol. 34, No. 5, pp. 854-862 <DOI:10.1021/es990817w>.

Zheng, D. et al., "Influence of Hydraulic Retention Time on Extent of PCE Dechlorination and Preliminary Characterization of the Enrichment Culture", Bioremediation Journal, Apr. 2001, vol. 5, No. 2, pp. 159-168 <DOI:10.1080/20018891079384>.

Zhu, M. et al., "Study on Oxidation Effect of Ozone on Petroleum-Based Pollutants in Water", Modern Applied Science, Jan. 2010, vol. 4, No. 1, pp. 6-11.

Zhu, N. et al., "Microwave Treatment of Hazardous Wastes: Remediation of Soils Contaminated by Non-Volatile Organic Chemicals Like Dioxins", Journal of Microwave Power and Electromagnetic Energy, 1992, vol. 27, No. 1, pp. 54-61 <DOI:10.1080/08327823.1992.11688171>.

Dutta, P. et al., "Adsorption of arsenate and arsenite on titanium dioxide suspensions", Journal of Colloid and Interface Science, Oct. 2004, vol. 278, No. 2, pp. 270-275 <DOI:10.1016/j.jcis.2004.06.015>.

Earth Microbiome Project, "16S rRNA Amplification Protocol" [online], EMP Protocols and Standards, Mar. 2016 [retrieved Apr. 22, 2019 from web.archive.org, as it appeared on Mar. 18, 2016], retrieved from the internet: <https://web.archive.org/web/20160318004703/http://press.igsb.anl.gov/earthmicrobiome/emp-standard-protocols/16s/>.

Earth Microbiome Project, "16S Taxonomic Assignments" [online], EMP Protocols and Standards, Apr. 2016 [retrieved Apr. 22, 2019 from web.archive.org, as it appeared on Apr. 26, 2016], retrieved from the internet: <https://web.archive.org/web/20160426034936/http://press.igsb.anl.gov/earthmicrobiome/emp-standard-protocols/16s-taxonomic-assignments/>.

Earth Microbiome Project, "18S rRNA Amplification Protocol" [online], EMP Protocols and Standards, Mar. 2016 [retrieved Apr. 22, 2019 from web.archive.org, as it appeared on Mar. 18, 2016], retrieved from the internet: <https://web.archive.org/web/20160318213325/http://press.igsb.anl.gov/earthmicrobiome/emp-standard-protocols/18s/>.

Earth Microbiome Project, "DNA Extraction Protocol" [online], EMP Protocols and Standards, Apr. 2016 [retrieved Apr. 22, 2019 from web.archive.org, as it appeared on Apr. 26, 2016], retrieved from the internet: <https://web.archive.org/web/20160426140902/http://press.igsb.anl.gov/earthmicrobiome/emp-standard-protocols/dna-extraction-protocol/>.

Earth Microbiome Project, "EMP Protocols and Standards" [online], Earth Microbiome Project, May 2016 [retrieved Apr. 22, 2019 from web.archive.org, as it appeared on May 24, 2016], retrieved from the internet: <URL:https://web.archive.org/web/20160524222055/http://www.earthmicrobiome.org/emp-standard-protocols/>.

Earth Microbiome Project, "Metadata Formatting" [online], EMP Protocols and Standards, Apr. 2016 [retrieved Apr. 22, 2019 from web.archive.org, as it appeared on Apr. 26, 2016], retrieved from the internet: <https://web.archive.org/web/20160426044811/http://press.igsb.anl.gov/earthmicrobiome/emp-standard-protocols/metadata-formatting/>.

Eaton, A. et al., "5210—Biochemical Oxygen Demand (BOD)", Standard Methods for the Examination of Water and Wastewater, 2005 (21st ed.), pp. 5.2-5.13.

Eda, G. et al., "Flight path of electrospun polystyrene solutions: Effects of molecular weight and concentration", Materials Letters, Mar. 2007, vol. 61, No. 7, pp. 1451-1455 <DOI:10.1016/j.matlet.2006.07.052>.

Edgar, R. et al., "Search and clustering orders of magnitude faster than BLAST", Bioinformatics, Oct. 2010, vol. 26, No. 19, pp. 2460-2461 <DOI:10.1093/bioinformatics/btq461>.

Einstein, A., "On the Motion of Small Particles Suspended in Liquids at Rest Required by the Molecular-Kinetic Theory of Heat", Annalen der Physik, 1905, vol. 322, pp. 549-560.

Ellis, D. et al., "Bioaugmentation for accelerated in situ anaerobic bioremediation", Environmental Science & Technology, Apr. 2000, vol. 34, No. 11, pp. 2254-2260 <DOI:10.1021/es990638e>.

Essien, O. et al., "Impact of crude-oil spillage pollution and chemical remediation on agricultural soil properties and crop growth", Journal of Applied Sciences and Environmental Management, Dec. 2010, vol. 14, No. 4, pp. 147-154 <DOI:10.4314/jasem.v14i4.63304>.

Falciglia, et al., "An Overview on Microwave Heating Application for Hydrocarboncontaminated Soil and Groundwater Remediation", Oil and Gas Research, 2016, vol. 2, No. 1, article 10000110, 6 pages <DOI:10.4172/2472-0518.1000110>.

Falciglia, P. et al., "Microwave heating remediation of soils contaminated with diesel fuel", Journal of Soil and Sediments, Sep. 2013, vol. 13, No. 8, pp. 1396-1407 <DOI:10.1007/s11368-013-0727-x>.

Falciglia, P. et al., "Remediation of hydrocarbon polluted soils using 2.45 GHz frequencyheating: Influence of operating power and soil texture on soil temperature profiles and contaminant removal kinetics", Journal of Geochemical Exploration, Apr. 2015, vol. 151, pp. 66-73 <DOI:10.1016/j.gexplo.2015.01.007>.

Fong, H. et al., "Beaded nanofibers formed during electrospinning", Polymer, Jul. 1999, vol. 40, No. 16, pp. 4585-4592 <DOI:10.1016/S0032-3861(99)00068-3>.

Gates, D. et al., "In-situ chemical oxidation of trichloroethylene using hydrogen peroxide", Journal of Environmental Engineering, Sep. 1995, vol. 121, No. 9, pp. 639-644 <DOI:10.1061/(ASCE)0733-9372(1995)121:9(639)>.

Goi, A. et al., "Combined chemical and biological treatment of oil contaminated soil", Chemosphere, Jun. 2006, vol. 63, No. 10, pp. 1754-1763 <DOI:10.1016/j.chemosphere.2005.09.023>.

Goi, A. et al., "Ozonation and Fenton treatment for remediation of diesel fuel contaminated soil", Ozone: Science & Engineering, Aug. 2006, vol. 28, No. 1, pp. 37-46 <DOI:10.1080/01919510500479130>.

Haapea, P. et al., "Integrated treatment of PAH contaminated soil by soil washing, ozonation and biological treatment", Journal of Hazardous Materials, Aug. 2006, vol. 136, No. 2, pp. 244-250 <DOI:10.1016/j.ihazmat.2005.12.033>.

Herzfelder, E., "Method for the determination of extractable petroleum hydrocarbons (EPH)", Massachusetts Department of Environmental Protection (MADEP), May 2004, vol. 39, 60 pages.

Hoof, F. et al., "Formation of oxidation by products in surface water preozonation and their behaviour in water treatment", Water Supply, 1986, vol. 4, No. 3, pp. 93-102.

Hoogesteij Von Reitzenstein, N. et al., "Morphology, structure, and properties of metal oxide/polymer nanocomposite electrospun mats", Journal of Applied Polymer Science, Sep. 2016, vol. 133, No. 33, article 43811, 9 pages <DOI:10.1002/APP.43811>.

Horiba Scientific., "Aqualog Software: User's Guide for version 3.6" [online], Horiba Scientific, Jun. 2012 [retrieved on Apr. 30, 2019 from horiba.com], retrieved from the internet: <URL:http://www.horiba.com/fileadmin/uploads/Scientific/Downloads/UserArea/Fluorescence/Manuals/AquaLog-User-Guide.pdf>.

Horiba Scientific., "Aqualog Version 3.6.10.1: Release Notes" [online], Horiba Scientific, Dec. 2014 [retrieved on Apr. 30, 2019 from

(56) References Cited

OTHER PUBLICATIONS horiba.com], retrieved from the internet: <URL:http://www.horiba.com/fileadmin/uploads/Scientific/Downloads/Software/Aqualog_Release_Notes.pdf>.

Hoskisson, P., "Continuous culture—making a comeback?", Microbiology, Oct. 2005, vol. 151, Pt. 10, pp. 3153-3159 <DOI:10.1099/mic.0.27924-0>.

Howe, K. et al., "Advanced Oxidation", in: Crittenden, J. et al., "MWH's Water Treatment : Principles and Design" (Hoboken, NJ, John Wiley & Sons, Inc. 2012), pp. 1415-1484.

Howe, K. et al., "Disinfection/Oxidation By-products", in: Crittenden, J. et al., "MWH's Water Treatment : Principles and Design" (Hoboken, NJ, John Wiley & Sons, Inc. 2012), pp. 1485-1527.

Huang, Z-M. et al., "A review on polymer nanofibers by electrospinning and their applications in nanocomposites", Composites Science and Technology, 2003, vol. 63, pp. 2223-2253 <DOI:10.1016/S0266-3538(03)00178-7>.

Irin, F. et al., "Detection of carbon nanotubes in biological samples through microwave-induced heating", Carbon, Oct. 2012, vol. 50, No. 12, pp. 4441-4449 <DOI:10.1016/j.carbon.2012.05.022>.

Jamieson, D. et al., "Coordinated surface activities in Variovorax paradoxus EPS", BMC Microbiology, Jun. 2009, vol. 9, No. 1, pp. 124-141 <DOI:10.1186/1471-2180-9-124>.

Javorská, H. et al., "Effect of ozonation on polychlorinated biphenyl degradation and on soil physico-chemical properties", Journal of Hazardous Materials, Jan. 2009, vol. 161, No. 2-3, pp. 1202-1207 <DOI:10.1016/j.ihazmat.2008.04.071>.

Jiang, Y. et al., "Engineered Crumpled Graphene Oxide Nanocomposite Membrane Assemblies for Advanced Water Treatment Processes", Environmental Science & Technology, May 2015, vol. 49, No. 11, pp. 6846-6854 <DOI:10.1021/acs.est.5b00904>.

Jiang, Y. et al., "Facile Aerosol Synthesis and Characterization of Ternary Crumpled Graphene-TiO2-Magnetite Nanocomposites for Advanced Water Treatment", ACS Applied Materials & Interfaces, Jul. 2014, vol. 6, No. 14, pp. 11766-11774 <DOI:10.1021/am5025275>.

Jones, D. et al., "Experimental evaluation of methods to quantify dissolved organic nitrogen (DON) and dissolved organic carbon (DOC) in soil", Soil Biology and Biochemistry, May 2006, vol. 38, No. 5, pp. 991-999 <DOI:10.1016/j.soilbio.2005.08.012>.

Jones, D. et al., "Microwave heating applications in environmental engineering—a review", Resources, Conservation and Recycling, Jan. 2002, vol. 34, No. 2, pp. 75-90 <DOI:10.1016/S0921-3449(01)00088-X>.

Jones, D. et al., "The recognition of biodegraded petroleum-derived aromatic hydrocarbons in recent marine sediments", Mar. 1983, vol. 14, No. 3, pp. 103-108 <DOI:10.1016/0025-326X(83)90310-7>.

Jordan, J. et al., "Experimental trends in polymer nanocomposites—a review", Materials Science and Engineering: A, Feb. 2005, vol. 393, No. 1-2, pp. 1-11 <DOI:10.1016/j.msea.2004.09.044>.

Jou, C-J. et al., "Application of microwave energy to treat granular activated carbon content with chlorobenzene" Environmental Progress & Sustainable Energy, Oct. 2010, vol. 29, No. 3, pp. 272-277 <DOI:10.1002/ep>.

Jung, H. et al., "Effects of in situ ozonation on structural change of soil organic matter", Environmental Engineering Science, 2003, vol. 20, No. 4, pp. 289-299 <DOI:10.1089/109287503322148564>.

Jung, H. et al., "Effects of in-situ ozonation on indigenous microorganisms in diesel contaminated soil: survival and regrowth", Chemosphere, Nov. 2005, vol. 61, No. 7, pp. 923-932 <DOI:10.1016/j.chemosphere.2005.03.038>.

Kang, G. et al., "Remediation of polycyclic aromatic hydrocarbons in soil using hemoglobin-catalytic mechanism", Journal of Environmental Engineering, Oct. 2015, vol. 141, No. 10, article 04015025, 5 pages <DOI:10.1061/(ASCE)EE.1943-7870.0000955>.

Karpenko, O. et al., "Chemical oxidants for remediation of contaminated soil and water. A review", Chemistry & Chemical Technology, 2009, vol. 3, No. 1, pp. 41-45.

Kawala, Z. et al., "Microwave-Enhanced Thermal Decontamination of Soil", Environmental Science & Technology, Jul. 1998, vol. 32, No. 17, pp. 2602-2607 <DOI:10.1021/es980025m>.

Keen, O. et al., "Enhanced biodegradation of carbamazepine after UV/H2O2 advanced oxidation", Environmental Science & Technology, Apr. 2012, vol. 46, No. 11, pp. 6222-6227 <DOI:10.1021/es300897u>.

Khan, F. et al., "An overview and analysis of site remediation technologies", Journal of Environmental Management, Jun. 2004, vol. 71, No. 2, pp. 95-122 <DOI:10.1016/j.jenvman.2004.02.003>.

Khare, H. et al., "A quantitative method for measuring nanocomposite dispersion", Polymer, Feb. 2010, vol. 51, No. 3, pp. 719-729 <DOI:10.1016/j.polymer.2009.12.031>.

Kim, B. et al., "Enhanced humification of soil organic matter by microwave irradiation and hyperthermal catalysts", Advanced Materials Research, Dec. 2014, vol. 1073-1076, pp. 696-699 <DOI:10.4028/www.scientific.net/AMR.1073-1076.696>.

Kim, H. et al., "Nutrient acquisition and limitation for the photoautotrophic growth of Synechocystis sp. PCC6803 as a renewable biomass source", Biotechnology and Bioengineering, Feb. 2011, vol. 108, No. 2, pp. 277-285 <DOI:10.1002/bit.22928>.

Kim, J. et al., "Modeling in situ ozonation for the remediation of nonvolatile PAH-contaminated unsaturated soils", Journal of Contaminant Hydrology, Apr. 2002, vol. 55, No. 3-4, pp. 261-285 <DOI:10.1016/S0169-7722(01)00196-6>.

Kim, T. et al., "Microwave heating of carbonbased solid materials", Carbon Letters, Jan. 2014, vol. 15, No. 1, pp. 15-24 <DOI:10.5714/CL.2014.15.1.015>.

Krajmalnik-Brown, R. et al., "Genetic Identification of a Putative Vinyl Chloride Reductase in Dehalococcoides sp. Strain BAV1", Applied and Environmental Microbiology, Oct. 2004, vol. 70, No. 10, pp. 6347-6351 DOI:10.1128/AEM.70.10.6347-6351.2004>.

Kulik, N. et al., "Degradation of polycyclic aromatic hydrocarbons by combined chemical pre-oxidation and bioremediation in creosote contaminated soil", Journal of Environmental Management, Mar. 2006, vol. 78, No. 4, pp. 382-391 <DOI:10.1016/j.jenvman.2005.05.005>.

Leach, M. et al., "Electrospinning Fundamentals: Optimizing Solution and Apparatus Parameters", Journal of Visualized Experiments, Jan. 2011, vol. 47, article e2494, 4 pages <DOI:10.3791/2494>.

Lee, B-T. et al., "Ozonation of diesel fuel in unsaturated porous media", Applied Geochemistry, Aug. 2002, vol. 17, No. 8, pp. 1165-1170 <DOI:10.1016/S0883-2927(02)00011-2>.

Lee, K. et al., "The change of bead morphology formed on electrospun polystyrene fibers", Polymer, Jun. 2003, vol. 44, No. 14, pp. 4029-4034 <DOI:10.1016/S0032-3861(03)00345-8>.

Lee, Y. et al., "Oxidative transformation of micropollutants during municipal wastewater treatment: Comparison of kinetic aspects of selective (chlorine, chlorine dioxide, ferrateVI, and ozone) and non-selective oxidants (hydroxyl radical)", Water Research, Jan. 2010, vol. 44, No. 2, pp. 555-566 <DOI:10.1016/j.watres.2009.11.045>.

Lehtola, M. et al., "Microbially available organic carbon, phosphorus, and microbial growth in ozonated drinking water", Water Research, May 2001, vol. 35, No. 7, pp. 1635-1640 <DOI:10.1016/S0043-1354(00)00449-8>.

Li, D. et al., "Electrospinning of Nanofibers: Reinventing the Wheel?", Advanced Materials, 2004, vol. 16, No. 14, pp. 1151-1170 <DOI:10.1002/adma.200400719>.

Li, D. et al., "Fabrication of Titania Nanofibers by Electrospinning", Nanoletters, Mar. 2003, vol. 3, No. 4, pp. 555-560 <DOI:10.1021/nl034039o>.

Li, D. et al., "Microwave thermal remediation of crude oil contaminated soil enhanced by carbon fiber", Journal of Environmental Sciences, 2009, vol. 21, pp. 1290-1295 <DOI:10.1016/S1001-0742(08)62417-1>.

Li, G. et al., "Degradation of Reactive Dyes in a Photocatalytic Circulating-Bed Biofilm Reactor", Biotechnology and Bioengineering, Apr. 2012 (available online Nov. 2011), vol. 109, No. 4, pp. 884-893 <DOI:10.1002/bit.24366>.

Li, S. et al., "Determination of multi-walled carbon nanotube bioaccumulation in earthworms measured by a microwavebased

(56) References Cited

OTHER PUBLICATIONS detection technique", Science of the Total Environment, Feb. 2013, vol. 445-446, pp. 9-13 DOI:10.1016/j.scitotenv.2012.12.037>.

Li, Y. et al., "Fabrication of polyaniline/titanium dioxide composite nanofibers for gas sensing application", Materials Chemistry and Physics, Sep. 2011, vol. 129, No. 1-2, pp. 477-482 <DOI:10.1016/j.matchemphys.2011.04.045>.

Liang, Y. et al., "Microarray-based functional gene analysis of soil microbial communities during ozonation and biodegradation of crude oil", Chemosphere, Apr. 2009, vol. 75, No. 2, pp. 193-199 <DOI:10.1016/j.chemosphere.2008.12.007>.

Liu, X. et al., "Combined effect of microwave and activated carbon on the remediation of polychlorinated biphenyl-contaminated soil", Chemosphere, Apr. 2006, vol. 63, No. 2, pp. 228-235 <DOI:10.1016/j.chemosphere.2005.08.030>.

Loffler, F. et al., "*Dehalococcoides mccartyi* gen. nov., sp. nov., obligately organohalide-respiring anaerobic bacteria relevant to halogen cycling and bioremediation, belong to a novel bacterial class, *Dehalococcoidia classis* nov., order *Dehalococcoidales* ord. nov. and family *Dehalococcoidaceae* fam. nov., within the phylum Chloroflexi", International Journal of Systematic and Evolutionary Microbiology, Feb. 2013, vol. 63, Pt. 2, pp. 625-635 <DOI:10.1099/ijs.0.034926-0>.

Lu, M. et al., "Remediation of petroleum-contaminated soil after composting by sequential treatment with Fenton-like oxidation and biodegradation", Bioresource Technology, Apr. 2010, vol. 101, No. 7, pp. 2106-2113 <DOI:10.1016/j.biortech.2009.11.002>.

Mackay, M. et al., "Nanoscale effects leading to non-Einstein-like decrease in viscosity", Nature Materials, Nov. 2003, vol. 2, No. 11, pp. 762-766 <DOI:10.1038/nmat999>.

Madani, M. et al., "PS/TiO2 (Polystyrene/Titanium Dioxide) Composite Nanofibers With Higher Surface-to-Volume Ratio Prepared by Electrospinning: Morphology and Thermal Properties", Polymer Engineering and Science, 2013, vol. 53, pp. 2407-2412 <DOI:10.1002/pen.23493>.

Magnuson, J. et al., "Reductive Dechlorination of Tetrachloroethene to Ethene by a Two-Component Enzyme Pathway", Applied and Environmental Microbiology, Apr. 1998, vol. 64, No. 4, pp. 1270-1275.

Mangal, R. et al., "Phase stability and dynamics of entangled polymer-nanoparticle composites", Nature Communications, Jun. 2015, vol. 6, No. 7198, pp. 1-9 <DOI:10.1038/ncomms8198>.

Matijević, E. et al., "Ferric hydrous oxide sols: III. Preparation of uniform particles by hydrolysis of Fe(III)-chloride, -nitrate, and -perchlorate solutions", Journal of Colloid and Interface Science, Mar. 1978, vol. 63, No. 3, pp. 509-524 <DOI:10.1016/S0021-9797(78)80011-3>.

Maymó-Gatell, X. et al., "Isolation of a Bacterium That Reductively Dechlorinates Tetrachloroethene to Ethene", Science, Jun. 1997, vol. 276, No. 5318, pp. 1568-1571 <DOI:10.1126/science.276.5318.1568>.

Mazinani, S. et al., "Morphology, structure and properties of conductive PS/CNT nanocomposite electrospun mat", Polymer, Jul. 2009, vol. 50, No. 14, pp. 3329-3342 <DOI:10.1016/j.polymer.2009.04.070>.

McKenna, E. et al., "Evaluation of the total petroleum hydrocarbon (TPH) standard for JP-4 jet fuel", Journal of Soil Contamination, 1995 (available online Dec. 2008), vol. 4, No. 4, pp. 355-406 <DOI:10.1080/15320389509383505>.

McMillen, S. et al., "Application of risk-based decision-making for international exploration and production site management", Risk-based decision-making for assessing petroleum impacts at exploration and production sites, Dept. of Energy and the Petroleum Environmental Research Forum (Tulsa, OK), Oct. 2001, pp. 187-197.

Medeiros, E. et al., "Effect of Relative Humidity on the Morphology of Electrospun Polymer Fibers", Canadian Journal of Chemistry, 2008, vol. 86, pp. 590-599 <DOI:10.1139/V08-029>.

Mehnert, C. et al., "Heterogeneous Heck Catalysis with Palladium-Grafted Molecular Sieves", Journal of the American Chemical Society, Nov. 1998, vol. 120, No. 47, pp. 12289-12296 <DOI:10.1021/ja971637u>.

Menéndez, J. et al., "Microwave heating processes involving carbon materials", Fuel Processing Technology, Jan. 2010, vol. 91, No. 1, pp. 1-8 <DOI:10.1016/j.fuproc.2009.08.021>.

Mercer, J. et al., "A review of immiscible fluids in the subsurface: properties, models, characterization and remediation", Journal of Contaminant Hydrology, Sep. 1990, vol. 6, No. 2, pp. 107-163 <DOI:10.1016/0169-7722(90)90043-G>.

Mohan, S. et al., "Bioremediation technologies for treatment of PAH-contaminated soil and strategies to enhance process efficiency", Reviews in Environmental Science and Bio/Technology, Nov. 2006, vol. 5, No. 4, pp. 347-374 <DOI:10.1007/s11157-006-0004-1>.

Moran, M. et al., "Chlorinated solvents in groundwater of the United States", Environmental Science & Technology, 2007 (available online Dec. 2006), vol. 41, No. 1, pp. 74-81 <DOI:10.1021/es061553y>.

Müller, J. et al., "Molecular Identification of the Catabolic Vinyl Chloride Reductase from *Dehalococcoides* sp. Strain VS and Its Environmental Distribution", Applied and Environmental Microbiology, Aug. 2004, vol. 70, No. 8, pp. 4880-4888 <DOI:10.1128/AEM.70.8.4880-4888.2004>.

Munter, R., "Advanced oxidation processes—current status and prospects", Proceedings of the Estonian Academy of Sciences, 2001, vol. 50, No. 2, pp. 59-80.

Mutyala, S. et al., "Microwave applications to oil sands and petroleum: A review", Fuel Processing Technology, Feb. 2010, vol. 91, No. 2, pp. 127-135 <DOI:10.1016/j.fuproc.2009.09.009>.

Naidu, R., "Recent Advances in Contaminated Site Remediation", Water, Air & Soil Pollution, Dec. 2013, vol. 224, Article 1705, 11 pages <DOI:10.1007/s11270-013-1705-z>.

Neta, P. et al., "Rate constants for reactions of inorganic radicals in aqueous solution", Journal of Physical and Chemical Reference Data, 1988, vol. 17, No. 3, pp. 1027-1284 <DOI:10.1063/1.555808>.

Nocentini, M. et al., "Bioremediation of a soil contaminated by hydrocarbon mixtures: the residual concentration problem", Chemosphere, Oct. 2000, vol. 41, No. 8, pp. 1115-1123 <DOI:10.1016/S0045-6535(00)00057-6>.

Ojha, S. et al., "Morphology of Electrospun Nylon-6 Nanofibers as a Function of Molecular Weight and Processing Parameters", Journal of Applied Polymer Science, 2008, vol. 108, pp. 308-319 <DOI:10.1002/app.27655>.

O'Mahony, M. et al., "The use of ozone in the remediation of polycyclic aromatic hydrocarbon contaminated soil", Chemosphere, Apr. 2006, vol. 63, No. 2, pp. 307-314 <DOI:10.1016/j.chemosphere.2005.07.018>.

Pai, C-L. et al., "Morphology of Porous and Wrinkled Fibers of Polystyrene Electrospun from Dimethylformamide", Macromolecules, Feb. 2009, vol. 42, No. 6, pp. 2102-2114 <DOI:10.1021/ma802529h>.

Palmer, G. et al., "Elemental analysis of lake sediment from Sudbury, Canada, using particle-induced X-ray emission", Science of the Total Environment, Nov. 1989, vol. 87-88, pp. 141-156 <DOI:10.1016/0048-9697(89)90231-3>.

Park, J-S. et al., "Kinetic decomposition of ozone and para-chlorobenzoic acid (pCBA) during catalytic ozonation", Water Research, May 2004, vol. 38, No. 9, pp. 2285-2292 <DOI:10.1016/j.watres.2004.01.040>.

Paslawski, J. et al., "Biodegradation kinetics of trans-4-methyl-1-cyclohexane carboxylic acid", Biodegradation, Feb. 2009, vol. 20, No. 1, pp. 125-133 <DOI:10.1007/s10532-008-9206-2>.

Patel, A. et al., "Electrospinning of Porous Silica Nanofibers Containing Silver Nanoparticles for Catalytic Applications", Chemistry of Materials, Feb. 2007, vol. 19, No. 6, pp. 1231-1238 <DOI:10.1021/cm061331z>.

Petri, B. et al., "Fundamentals of ISCO Using Hydrogen Peroxide", in: Springer (ed.) "In Situ Chemical Oxidation for groundwater remediation" (Springer, May 2011), pp. 33-88.

(56) References Cited

OTHER PUBLICATIONS

Pierzynski, G., "Methods of phosphorus analysis for soils, sediments, residuals, and waters", Southern Cooperative Series Bulletin, 2000, No. 396.

Pinedo, J. et al., "Assessment of soil pollution based on total petroleum hydrocarbons and individual oil substances", Journal of Environmental Management, Nov. 2013, vol. 130, pp. 72-79 <DOI:10.1016/j.jenvman.2013.08.048>.

\* cited by examiner

MICROWAVE-ENABLED THERMAL REMEDIATION OF ORGANIC CHEMICAL CONTAMINATED SOILS USING DIELECTRIC NANOMATERIALS AS ADDITIVES

CROSS REFERENCE TO RELATED APPLICATION

This application claims the benefit of U.S. Provisional Application No. 62/400,735, filed Sep. 28, 2016, which is incorporated herein by reference in its entirety.

STATEMENT OF GOVERNMENT INTEREST

This invention was made with government support under 1449500 awarded by the National Science Foundation. The government has certain rights in the invention.

TECHNICAL FIELD

This invention relates to removing or reducing persistent organic chemicals, such as long-chain petroleum hydrocarbons, from contaminated soils using dielectric carbon nanomaterials as additives during microwave-enabled thermal remediation.

BACKGROUND

Long chain, heavy petroleum hydrocarbons in soils create a persistent environmental liability; these heavier fractions are less prone to natural weathering processes including volatilization, biodegradation, and dissolution. Since the early 1960s, nearly $6.8 \times 10^8$ kg of oil have spilled into United States soils from pipelines breaks or seepage from corroded lines. In addition, nearly $1.0 \times 10^9$ kg oil have spilled into United States marine waters, which often ends up on land unless contained or recovered after the spill. Of particular concern are petroleum residuals containing 12 to 40 carbon chain lengths (C12-C40) because of their low volatility and biodegradability.

SUMMARY

In one aspect, treating contaminated soil includes combining a dielectric carbonaceous nanomaterial with contaminated soil to yield a composite contaminated soil, and irradiating the composite contaminated soil with microwave radiation to yield a remediated soil. The composite contaminated soil includes at least 1 wt % of the dielectric carbonaceous material, and the microwave radiation provides an energy input of at least 2.5 kWh per kilogram of the composite contaminated soil.

Implementations of this aspect may include one or more of the following features.

The contaminated soil typically includes at least 0.2 wt % of hydrocarbons having 12 to 40 carbon atoms. The water content of the contaminated soil is typically in a range of 20 wt % to 80 wt % of the water holding capacity of the soil. The microwave radiation can have a frequency in a range of 300 MHz to 300 GHz. The microwave radiation can have a power in a range of 500-3000 W. The irradiated composite soil may reach a temperature of at least 150° C., 170° C., or 190° C. An energy input to the composite contaminated soil can be at least 5 kWh per kilogram of composite contaminated soil. The remediated soil typically contains less than 2 wt % or less than 0.2 wt % of hydrocarbons having 12 to 40 carbon atoms. Total petroleum hydrocarbon (TPH) removal percentages in C12-C20, C20-C28, and C28-C36 carbon chain length fractions are typically at least 65%, at least 55%, or at least 35%, respectively. In some cases, TPH removal percentages in C12-C20, C20-C28, and C28-C36 carbon chain length fractions are up to 95%, 85%, and 75%. Overall TPH removal may be at least 30%, at least 40%, at least 50%, at least 60%, at least 70%, at least 80%, or at least 90%. The dielectric carbonaceous nanomaterial may include at least one of graphene, graphene oxide, carbon nanotubes, carbon nanofibers, and superfine powered activated carbon. The composite contaminated soil typically includes less than 10 wt % of the dielectric carbonaceous nanomaterial.

In one example, the composite contaminated soil is irradiated with the microwave radiation for a length of time in a range of 1 second to 900 seconds or 1 second to 100 seconds. In another example, the remediated soil contains less than 2 wt % or less than 0.2 wt % of hydrocarbons having 12 to 40 carbon atoms.

In some implementations, irradiating the composite contaminated soil with the microwave radiation occurs ex situ. One example includes providing the contaminated soil to a conveyor belt proximate a microwave radiation source. In some cases, irradiating the composite contaminated soil with the microwave radiation occurs when the contaminated soil is on the conveyor belt. In certain cases, the conveyor belt is fabricated to contain the dielectric carbonaceous nanomaterial, such that combining the dielectric carbonaceous nanomaterial with the contaminated soil includes contacting the contaminated soil with the conveyor belt. Combining the dielectric carbonaceous nanomaterial with the contaminated soil may occur before, during, or after providing the contaminated soil to the conveyor belt.

In some implementations, irradiating the composite contaminated soil with the microwave radiation occurs in situ. One example includes tilling the contaminated soil, and combining the dielectric carbonaceous nanomaterial with the contaminated soil after tilling the contaminated soil. In another example, irradiating the composite contaminated soil includes penetrating the composite contaminated soil with an antenna capable of emitting microwaves, and translating the antenna through the composite contaminated soil.

Further areas of applicability will become apparent from the description provided herein. The description and specific examples in this summary are intended for purposes of illustration only and are not intended to limit the scope of the present disclosure.

DETAILED DESCRIPTION

Figure 1:
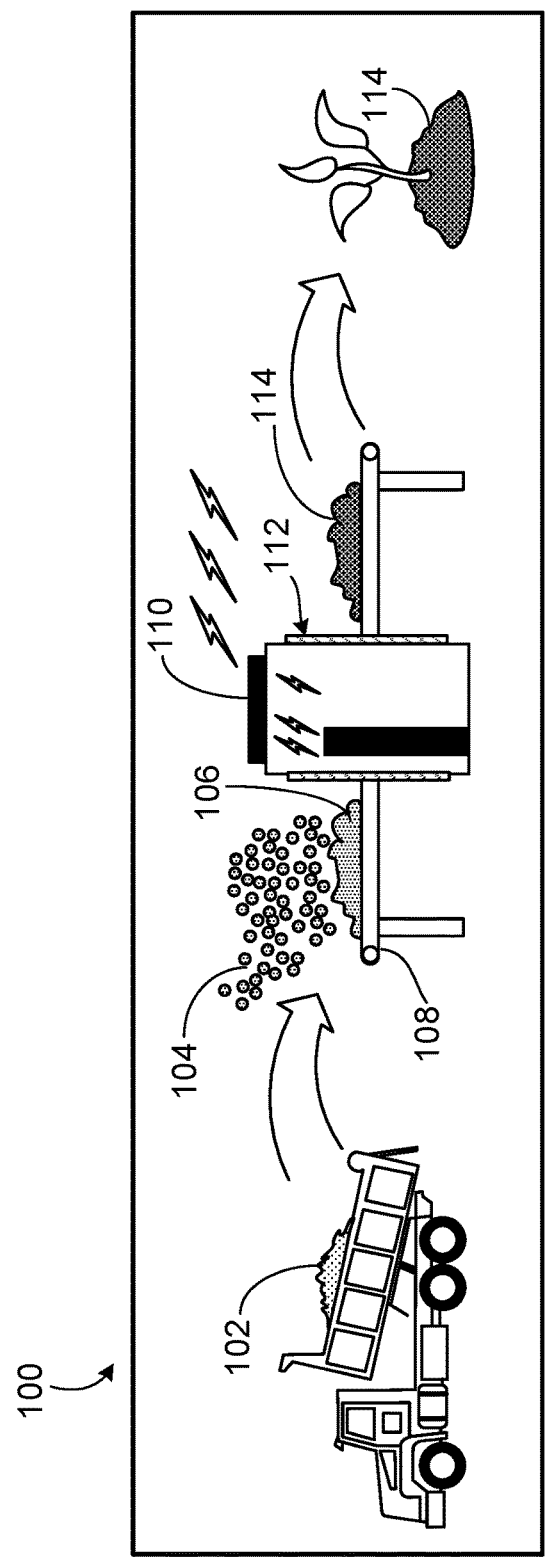
FIG. 1 depicts remediation of soil by microwave-enabled thermal treatment using dielectric carbonaceous nanomaterial as dielectric additives.

Microwave-enabled thermal treatment of petroleum hydrocarbon-containing soils is a cost- and time-effective remediation solution. Microwave-enabled thermal treatment of petroleum hydrocarbon-containing soils (i) decomposes polar and polarizable hydrocarbon components, which are more susceptible to microwave absorption, (ii) evaporates volatile components regardless of their affinity to microwave energy because of locally heated regions of the surrounding environment, and (iii) co-evaporates non-volatile components that can be stripped with the steam generated from evaporation of water molecules. Microwave-enabled heating introduces an electromagnetic field to the target matrix and generates heat via two predominant mechanisms: (i) polar molecules (i.e., compounds with permanent and induced dipoles such as water or chlorinated organics) rotate erratically to align themselves to the incoming dielectric field, physical resistance causes friction, and subsequent heat release elevates the temperature of the molecules and their surroundings; and (ii) free electrons of charged particles (i.e., freely moving charged particles within a region such as $\pi$ electrons of graphitic carbon surface) trying to couple to the changes of electric field dissipate energy in the form of heat.

Dielectric additives augment localized heating, which further enhances these processes. The heat induction, which is the ability to suppress electromagnetic radiation and convert it to thermal energy, is influenced by the dielectric properties of the additives. Dielectric properties of compounds are governed at least in part by their polarity and morphology. The selective nature of microwave heating can further be localized by utilizing dielectric additives with favorable dielectric properties. Carbonaceous nanomaterials have an exceptional electron budget on the 7c-orbitals and, as disclosed herein, when used as dielectric additives to augment microwave-enabled thermal treatment of petroleum soils, show extraordinary heating performance when mixed with soil, thereby enhancing removal of total petroleum hydrocarbons (TPH) from contaminated soil. Suitable dielectric carbonaceous nanomaterials include, but are not limited to graphitic carbon allotropes such as single- and multi-walled carbon nanotubes, graphene nanosheets, graphene oxide nanosheets, carbon nanofibers, and the like, and superfine powdered activated carbons having particle sizes of less than 1 μm (e.g., average particle size of about 0.2 μm). In contrast, conventional dielectric carbonaceous materials include granular activated charcoal (GAC), powder activated carbon (PAC), charcoal, and carbon fibers. This disclosure provides evidence on the effectiveness of dielectric carbonaceous nanomaterials as additives to microwave-enabled thermal remediation and identifies advantageous properties of select carbon nanomaterials.

Advantages of using dielectric carbonaceous nanomaterials as opposed to conventional carbonaceous materials include more efficient heating of soils during microwave-enabled heating. Dielectric additives augment localized heating, which further enhances: decomposition of polar and polarizable hydrocarbon components, which are more susceptible to microwave absorption; evaporation of volatile components regardless of their affinity to microwave energy because of locally heated regions of the surrounding environment; and co-evaporation of non-volatile components that can be stripped with the steam generated from evaporation of water molecules. For an equivalent amount of energy, the dielectric carbonaceous nanomaterials provide a greater level of contaminant removal. In addition, nanoparticulates distribute throughout the soil more effectively and provide an enhanced surface area for energy uptake and contact with surrounding soils.

The use of dielectric carbonaceous nanomaterials to augment microwave-enabled thermal remediation accelerates the heating process, and is therefore typically more efficient in terms of power use. Soil remediation methods described herein may occur in situ or ex situ. In general, a dielectric carbonaceous nanomaterial is combined with contaminated soil to yield a composite contaminated soil. The contaminated soil typically includes at least 0.2 wt % of hydrocarbons having 12 to 40 carbon atoms. A water content of the contaminated soil is typically in a range of 20 wt % to 80 wt % of the water holding capacity of the soil. The dielectric carbonaceous nanomaterial includes at least one of graphene, graphene oxide, carbon nanotubes, carbon nanofibers, and superfine powdered activated carbon. The composite contaminated soil is irradiated with microwave radiation to yield remediated soil. The microwave radiation typically has a frequency in a range of 300 MHz to 300 GHz. The composite contaminated soil is can be irradiated with the microwave radiation for a length of time in a range of 1 second to 900 seconds (e.g., 1 second to 100 seconds). An energy input to the composite contaminated soil can be at least 2.5 or at least 5 kWh per kilogram of composite contaminated soil. The irradiated composite soil may reach a temperature of at least 150° C., 170° C., or 190° C. The remediated soil typically contains less than 2 wt % or less than 0.2 wt % of hydrocarbons having 12 to 40 carbon atoms. TPH removal percentages in C12-C20, C20-C28, and C28-C36 carbon chain length fractions are typically at least 65%, at least 55%, or at least 35%, respectively. In some cases, TPH removal percentages in C12-C20, C20-C28, and C28-C36 carbon chain length fractions are up to 95%, 85%, and 75%.

For ex-situ treatment, contaminated soil may be transported to a facility where a treatment process (e.g., batch or continuous) combines dielectric carbonaceous nanomaterial with the contaminated soil to yield composite contaminated soil, and the composite contaminated soil is irradiated with microwave irradiation. FIG. 1 depicts an ex situ process 100 for treating contaminated soil. In ex situ process 100, contaminated soil 102 is combined with dielectric carbonaceous nanomaterial 104 to yield composite contaminated soil 106. Contaminated soil 102 or composite contaminated soil 106 may be provided to conveyor belt 108 proximate microwave radiation source 110. Composite contaminated soil 106 is irradiated with microwave radiation 112 from microwave radiation source 110 to yield remediated soil 114. Irradiating composite contaminated soil 106 with microwave radiation 112 occurs when the composite contaminated soil is on conveyor belt 108. In some cases, conveyor belt 108 is fabricated to contain dielectric carbonaceous nanomaterial 104, such that combining dielectric carbonaceous nanomaterial 104 with contaminated soil 106 occurs when conveyor belt 108 is contacted with the contaminated soil. Combining dielectric carbonaceous nanomaterial 104 with contaminated soil 106 may occur before, during, or after providing the contaminated soil to conveyor belt 108.

Figure 2:
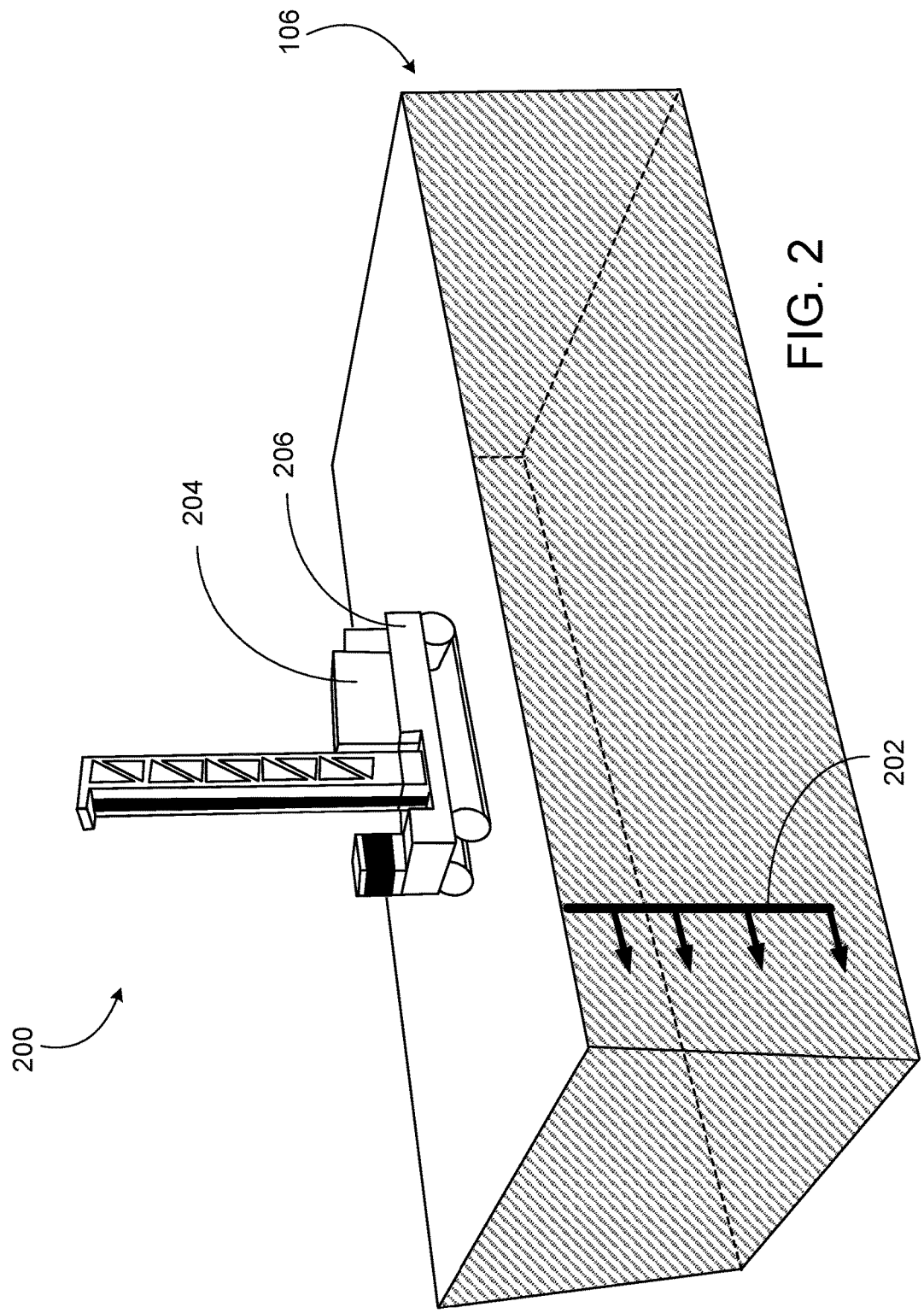
FIG. 2 depicts in situ soil remediation via microwave-enabled soil remediation.

In one example of an in situ application, FIG. 2 depicts apparatus 200 for large-scale field deployment. In situ volumetric heating of contaminated soil by microwave irradiation can be facilitated through preliminary soil augmentation via tilling of contaminated soil and combining dielectric carbonaceous nanomaterial with the contaminated soil to yield composite contaminated soil 106, followed by penetration of the composite contaminated soil with radio antennas 202 for both large and small-scale applications. In some cases, the addition of dielectric carbonaceous nanomaterial to the contaminated soil occurs after tilling the contaminated soil. Radio antennas 202 are coupled to microwave source and power supply 204, all of which are coupled to rolling rig 206. Radio antennas 202 penetrate composite contaminated soil 106 as rolling rig 206 moves across surface 208, translating the antennas through the composite contaminated soil as microwaves are emitted as indicated by the arrows.

Dielectric carbonaceous nanomaterial may be added to contaminated soil in a range of 1 wt % to 10 wt % (e.g., 2 wt % to 8 wt % or 4 wt % to 6 wt %). The soil containing the dielectric carbonaceous nanomaterial may be irradiated for 1 second to 60 seconds (e.g., 10 seconds to 50 seconds or 20 seconds to 40 seconds) with microwaves in a frequency range of 300 MHz and 300 GHz (e.g., 0.9 GHz and 2.45 GHz) and having a power in a range of 500-3000 W. In some cases, a TPH content of contaminated soil to be treated is at least 0.1 wt % or 0.2 wt %, where TPH refers to hydrocarbons having 12-40 carbon atoms. In certain cases, contaminated soil treated as described herein may have moisture content in a range of 20% to 80% of the water holding capacity of the soil. As disclosed herein, microwave-enabled thermal remediation of soil containing petroleum hydrocarbons may reduce the amount of C12-C40 hydrocarbons to less than 0.2% wt % or 2 wt % in remediated soil.

EXAMPLES

Materials.

The soil used was a homogenous mixture of samples obtained from multiple locations at a decommissioned oil field in the United States and contained 11,000 mg/kg TPH. The sand/silt/clay soil matrix was contaminated with a 40 API gravity crude oil and had been weathering in-situ at the field site. The soil had 33.8% w/w water holding capacity. Additional soil characterization is described in O. G. Apul et. al, *Treatment of heavy, long-chain petroleum-hydrocarbon impacted soils using chemical oxidation*, 142 J. Environ. Eng. 12 (2016) and T. Chen et. al., *Ozone enhances the bioavailability of heavy hydrocarbons in soil*, 11 J. Environ. Eng. Sci. 7-17 (2016). Experiments were conducted with two soils from the same source (as-received or after aerobic biodegradation). Soil was biodegraded by providing a source of macronutrients, trace minerals, and vitamin solutions as described in A. G. Delgado et al., *Successful operation of continuous reactors at short retention times results in high density, fast-rate Dehalococcoides dechlorinating cultures*, 98 Appl. Microbiol. Biotechnol. 2729-37 (2014) and mixing twice weekly. The TPH concentration of the biodegraded soil was 2481±192 mg/kg.

One type of multi-walled carbon nanotubes (NC7000, labeled as MWCNT-1) was obtained from Nanocyl SA (Nanocyl SA, Sambreville, Belgium). Carbon nanofibers (iron-free, conical >99%, diameter 100 nm, length 20-200 µm, pore size 0.075 $cm^3/g$) and the second type of multi-walled carbon nanotubes (labeled as MWCNT-2; 95% carbon content trace metal basis, outer diameter 7-15 nm, inner diameter 3-6 nm, length 0.5-200 µm) were purchased from Sigma Aldrich (St. Louis, Mo.). Powdered activated carbon (PAC 20B) was purchased from Cabot Norit Americas Inc. (Boston, Mass.). Superfine powdered activated carbon (SPAC) was obtained by pulverizing PAC 20B to submicron particle sizes via wet milling. Graphene (N006-010-P) and graphene oxide (N002-PDE) were purchased from Angstron Materials (Dayton, Ohio). Food grade charcoal (bamboo activated charcoal powder, mesh 325) was purchased from Charcoal House, LLC (Crawford, Nebr.). Washed silica sand (Mesh No: 40-60) and glass wool fibers were used as controls. The additive materials were utilized as received from the manufacturer without any physical or chemical preconditioning.

Microwave Treatment.

Five grams of contaminated soil (containing 18.7 wt % moisture) was placed into a 40 mL glass vial or porcelain crucible dish with no cap or cover. Additives (1-5% w/w) were manually mixed into the soil matrix to ensure sample homogeneity. The vials were placed on a rotator disk into a household Hamilton Beach microwave oven (Glen Allen, Va.; Model No: P100N30ALS3B, 2.45 GHz, 1000-W output) in a laboratory hood and set to the desired experimental time (varying between 15 seconds to 5 minutes). The active power generated by the microwave was measured online by Kill A Watt® (P3 International). Soil temperature measurements were obtained immediately following treatment using a handheld, VWR non-contact infrared digital temperature gun (Radnor, Pa.).

Total Petroleum Hydrocarbons (TPH) Analysis.

Soil sample TPH concentrations were analyzed by an independent analytical lab (Eurofins Lancaster Laboratories; Lancaster, Pa.) or in-house. For external laboratory analysis, bulk soil preparation (SW-846 5035A Modified) and extractable petroleum hydrocarbon detection for soils (SW-846 3546) were followed. All TPH concentrations were corrected according to surrogate (i.e., o-terphenyl) recovery percentages, which ranged from 64 to 93%. For in-house analysis, one gram of soil was dried with sodium sulfate and extracted with dichloromethane (DCM) in a Gerhardt® Soxtherm automatic extractor (Gerhardt Analytical System, Konigswinter, Germany), as described in Chen et al. Prior to extraction, samples were spiked with 50 µL of 1-chlorooctadecane and o-terphenyl from 1000 mg/L stock solutions to verify recovery. All TPH concentrations were corrected according to average surrogate recoveries, which ranged from 74% to 92%. The DCM extract was concentrated to 1 mL final volume, filtered through a 0.2-µm PTFE filter, and analyzed on a GC-FID (Shimadzu GC2010, Shimadzu Corp., Md., USA). All TPH concentrations were reported per dry weight of the soil.

Biodegradation Procedure for Soils Containing Petroleum Hydrocarbons.

Soil was biodegraded in a 1.5 L glass pan containing 1.25 kg of soil. Each kg of soil was dosed with 10 mL of macronutrient solution, 1 mL Trace A solution, 1 mL Trace B solution, and 1 mL vitamin mix solution for bacterial growth. The composition of these solutions is described in Delgado et al., 2014. The soil was mixed/tilled twice weekly to oxygenate, and DI water was provided to maintain the moisture content at 60-80% of the soil water holding capacity (i.e., 15-18% w/w). Incubations were performed for 120 days at 30° C. in the dark.

Extraction and Quantification of Total Petroleum Hydrocarbons from Soil.

One gram of soil was dried with sodium sulfate and extracted with dichloromethane (DCM) in a Gerhardt® Soxtherm automatic extractor (Gerhardt Analytical System, Konigswinter, Germany). The DCM extract was concentrated to 1 mL final volume, filtered through a 0.2-µm PTFE filter, and analyzed on a GC-FID (Shimadzu GC2010, Shimadzu Corp., Md., USA) equipped with a Restek Rxi®-1HT column (30 m×0.25 mm×0.25 µm). The GC-FID analytical method was developed according to the extractable petroleum hydrocarbons standard method (Method for the Determination of Extractable Petroleum (MADEP), 2004]. TPH was defined as the collective concentration of all compounds eluting from n-nonane (C9) to n-tetracontane (C40). Calibration curves were generated to obtain calibration factors using an alkane C9-C40 standard mixture (Sigma-Aldrich Co. Ltd.; St. Louis, Mo.) at six different concentrations between 2 and 200 mg/L. All TPH concentrations were reported per dry weight of the soil.

Microwave-Enabled Thermal Treatment of Soils Containing Petroleum Hydrocarbons.

Figure 3:
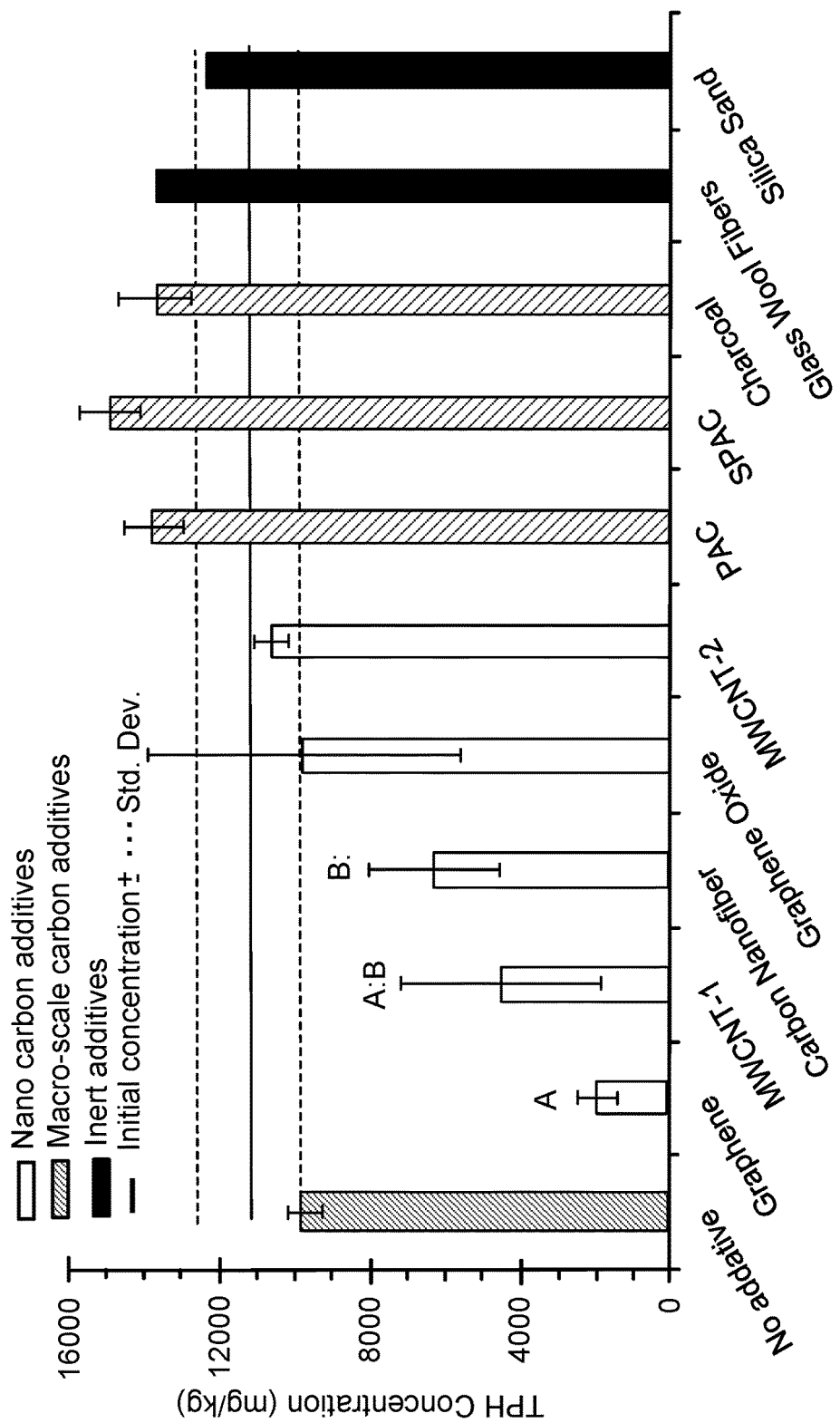
FIG. 3 shows total petroleum hydrocarbon (TPH) concentration in soil after 60-second microwave treatment with and without dielectric additives.

Petroleum hydrocarbon-containing soils with ten different additive materials were irradiated in a microwave for 60 seconds. FIG. 3 shows the TPH concentrations in soil after 60-second microwave treatment with and without dielectric additives. Indicator letters (A and B) show treatments that are significantly lower than initial TPH concentration at 95% level of significance (p<0.05) where same letters indicate statistical indifference. Solid and dashed lines indicate initial TPH concentration±standard deviation of triplicate measurements. In FIG. 3, MWCNT: Multi-walled carbon nanotubes, PAC: powdered activated carbon, SPAC: superfine powdered activated carbon.

Microwave treatment of soil with no additives showed no detectable decrease in TPH concentration. Likewise, addition of washed silica sand and glass wool fibers had no decrease in TPH after microwave treatment. Similarly, macro-scale carbon additives (PAC, SPAC, and charcoal) showed no statistically significant ($\alpha$=0.05) decrease in TPH after 60 seconds of microwave treatment. Treatments with some dielectric carbonaceous nanomaterial showed TPH removal up to 82%. The TPH concentrations were significantly (p<0.05) lower than initial TPH concentration when graphene, MWCNT-1, or carbon nanofiber was added. Graphene and MWCNT-1 performed best. Differences in additive performance were attributed to the varying morphology and dielectric properties (e.g., dielectric tangent loss) of selected additives. These results demonstrate that the unique dielectric properties of these dielectric carbonaceous nanomaterials augment microwave irradiation soil remediation techniques. In particular, MWCNT type influences performance in microwave-enabled remediation. For example, variability in dielectric tangent losses (0.25-1.44) for carbon nanotubes can be attributed to the morphological differences of the tubes or the unpredictable cluster formation of the nanotubes.

Figure 4:
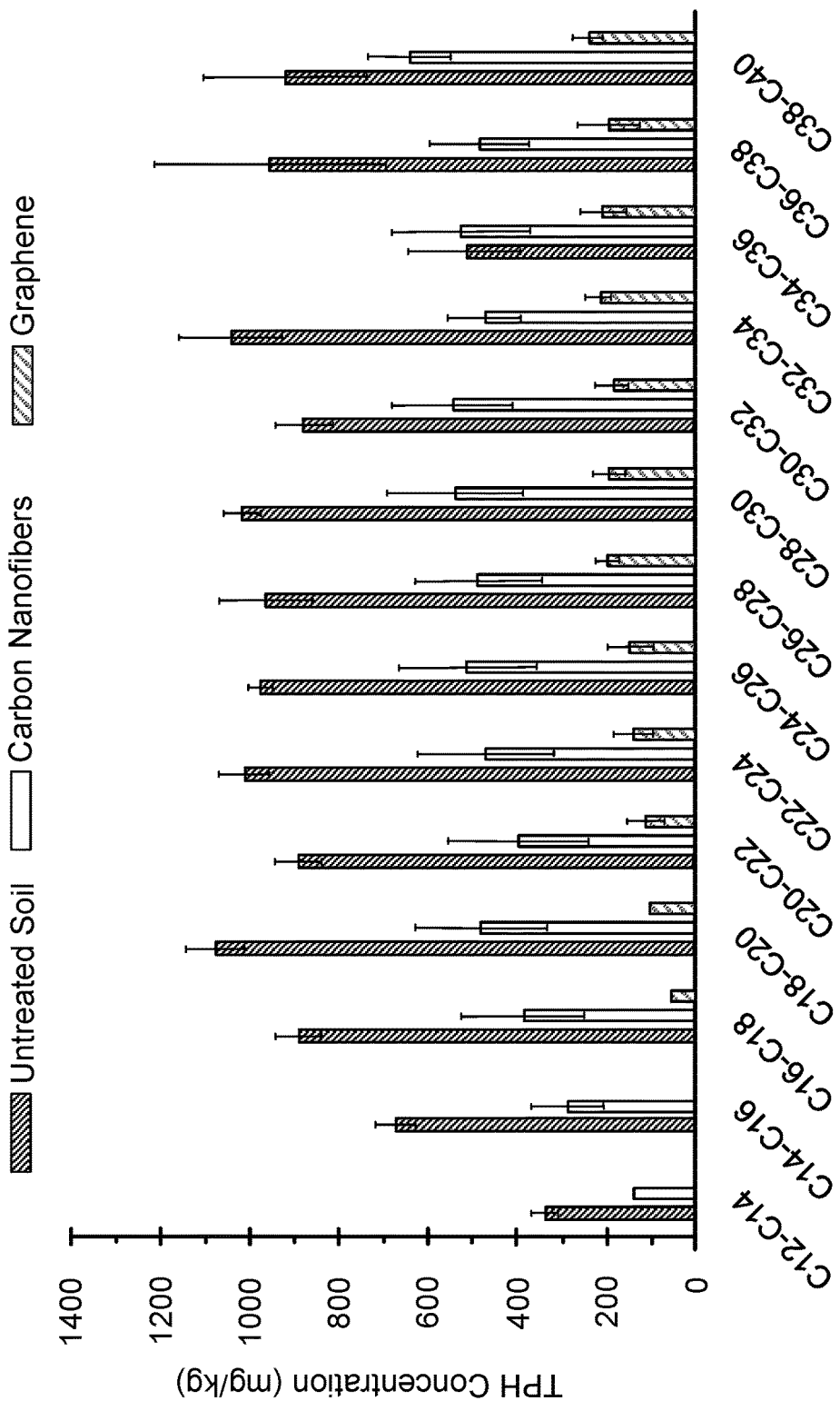
FIG. 4 shows TPH concentration by carbon chain length in soil before and after 60-second microwave treatment for select dielectric carbonaceous materials.

Selected residual TPH distributions showing carbon chain lengths before microwave treatment (untreated soil) and after 60-second microwave treatment (graphene and carbon nanofiber additives) are shown in FIG. 4. In particular, FIG. 4 shows TPH concentration by carbon chain length in soil before and after 60-second microwave treatment for select dielectric carbonaceous materials. Error bars indicate standard deviation of triplicate experiments. When two bars are present per range of carbon number, the left bar represents untreated soil and the right bar represents carbon nanofibers. When three bars are present per range of carbon number, the left bar represents untreated soil, the middle bar represents carbon nanofibers, and the right bar represents graphene. The shorter chain hydrocarbon concentrations were smaller than longer chain hydrocarbons after microwave treatment. For example, TPH removal percentages in C12-C20, C20-C28, and C28-C36 carbon chain length fractions were 94%, 81%, and 73%, respectively, for graphene and 66%, 55%, and 38%, respectively, for carbon nanofibers. The shorter chain hydrocarbons appear more prone to microwave-enabled thermal remediation with dielectric carbonaceous nanomaterials.

Bulk soil temperatures rose to 190° C. when irradiated with some of the additives (i.e., graphene, MWCNT-1 or carbon nanofibers) and rose only to 40-50° C. with no additive. During irradiation a thick, black flue colored gas was emitted from the soil almost immediately. This gas was thought to be a mixture of volatilized hydrocarbons, steam from soil moisture, and gaseous oxidation products. Another visual observation was the generation of white or light blue colored sparks, especially when graphenes and MWCNTs were irradiated. The sparks were attributed to graphitic carbon allotropes reflecting microwave radiation fractions where delocalized $\pi$-electrons can move freely, enabling them to jump out and ionize the surrounding atmosphere. These sparks are defined as microplasmas (i.e., plasmas confined to a small region that last for a fraction of a second).

Two control additives with poor dielectric properties, washed silica sand (dense particles resembling activated carbon) and glass wool fibers (loose and cottony fibers resembling carbon fibers), showed no notable performance, confirming their low microwave heating capacities.

Figure 5:
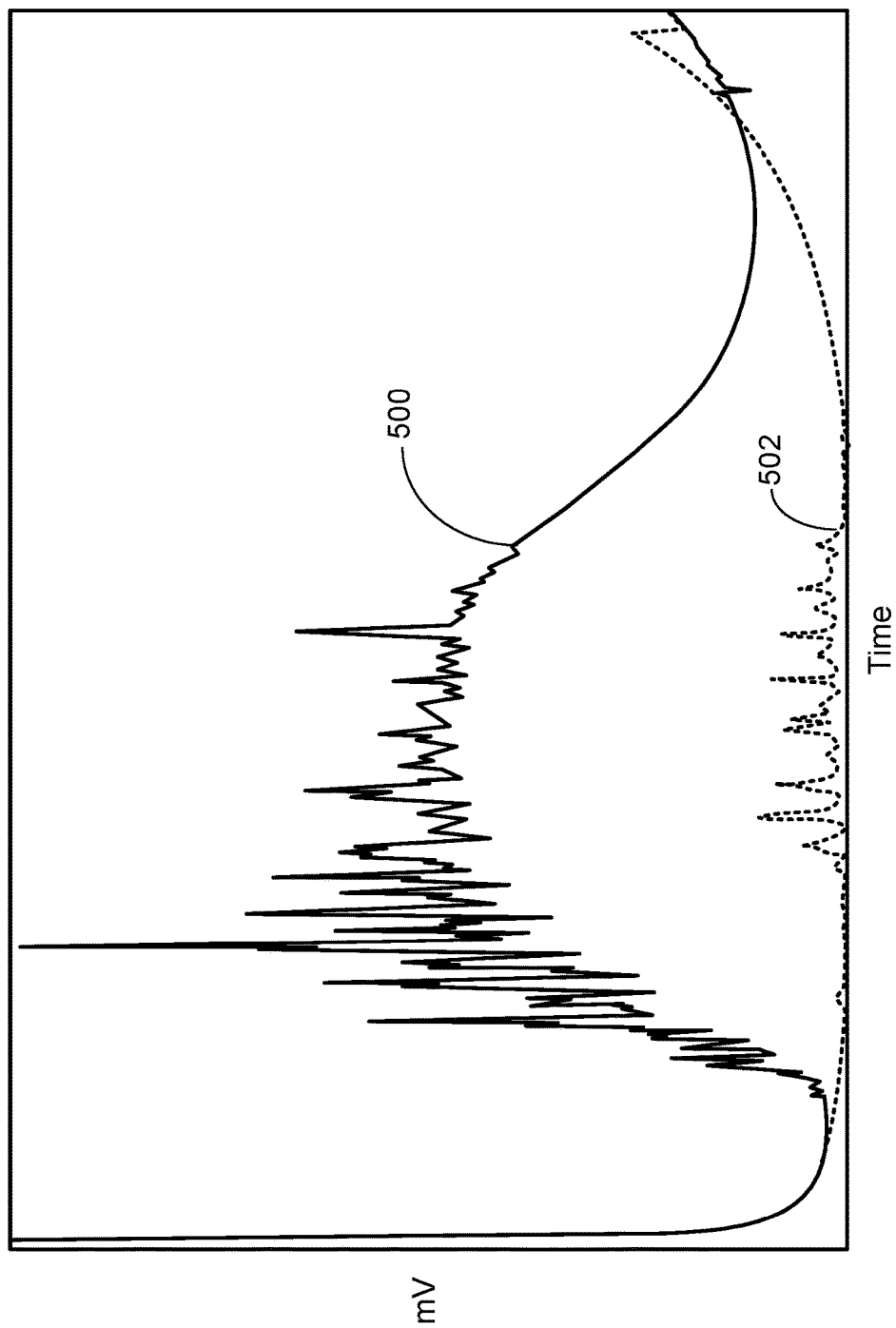
FIG. 5 shows chromatograms of soils containing petroleum hydrocarbons before and after 15 minute microwave irradiation enhanced with granular activated carbon.

Microwave treatment of soils using granular activated carbons as additives: two grams of contaminated soil (containing 14,000 mg/kg TPH, 12.5% soil moisture) were placed into a 40 ml borosilicate VOA vial. Calgon granular activated carbon (10% w/w) was added to the soil matrix and manually mixed to ensure sample homogeneity. The vials were placed on a rotator disk in a household Hamilton Beach (Glen Allen, Va.; Model No: P100N30ALS3B, 2.45 GHz, 1000-W output) microwave oven in a laboratory hood and set to 15 minutes. Residual TPH chromatograms were generated in-house using SRI 8610C Gas Chromatograph with Restek MXT-1HT SimDist column (10 m, 0.53 mm ID, 0.21 um df). Temperature programming was: 40-380° C. at 20° C./min (total 17 minute run time) with gas flow rates of helium carrier 10 ml/min, hydrogen 20 ml/min, and air 230 ml/min. TPH removal greater than 90% was achieved. FIG. 5 shows chromatograms of soils containing petroleum hydrocarbons, including chromatograms of soil before 15 minute microwave irradiation in plot 500 and soil after 15 minute microwave irradiation enhanced with granular activated carbon in plot 502. The granular activated carbon test results demonstrate that macro-scale graphitic materials can also remove TPH, but the prolonged irradiation process is more energy intensive and would directly influence the cost of the treatment.

Effect of Operational Parameters.

Performance of microwave-enabled thermal treatment is influenced by operational parameters including (i) microwave energy input or heating time, (ii) dielectric additive amount, (iii) moisture content, and (iv) microwave frequency. Irradiation time as an operational parameter affects cost and is therefore considered in balance with remediation efficiency. As described with respect to FIG. 5, 15 minute irradiation was applied using granular activated carbon additives and removed TPH from soil as described; however, dielectric carbonaceous nanomaterials showed similar performances with much shorter irradiation times.

Figure 6:
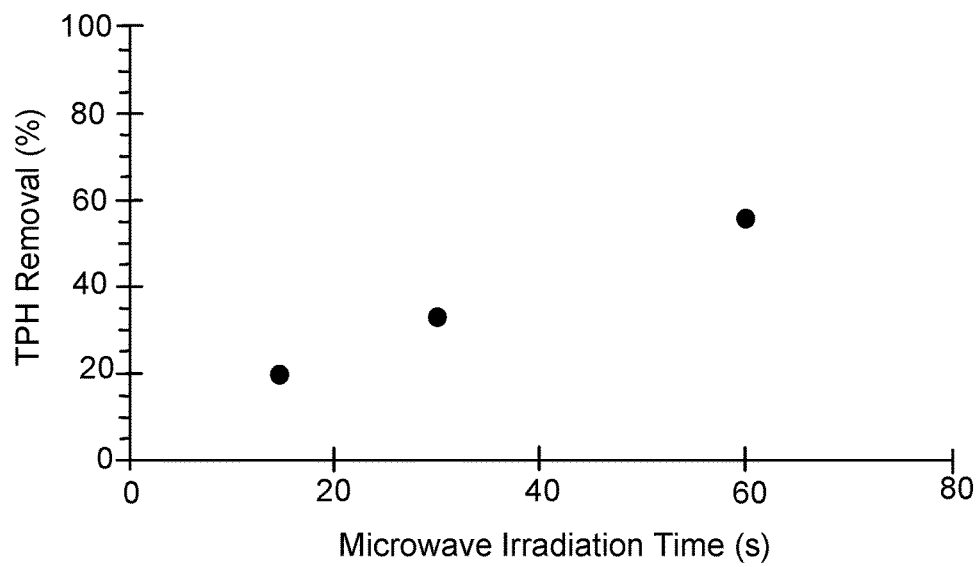
FIG. 6 show the effect of microwave irradiation time on TPH removal using multi-walled carbon nanotubes as a dielectric additive.
Figure 7:
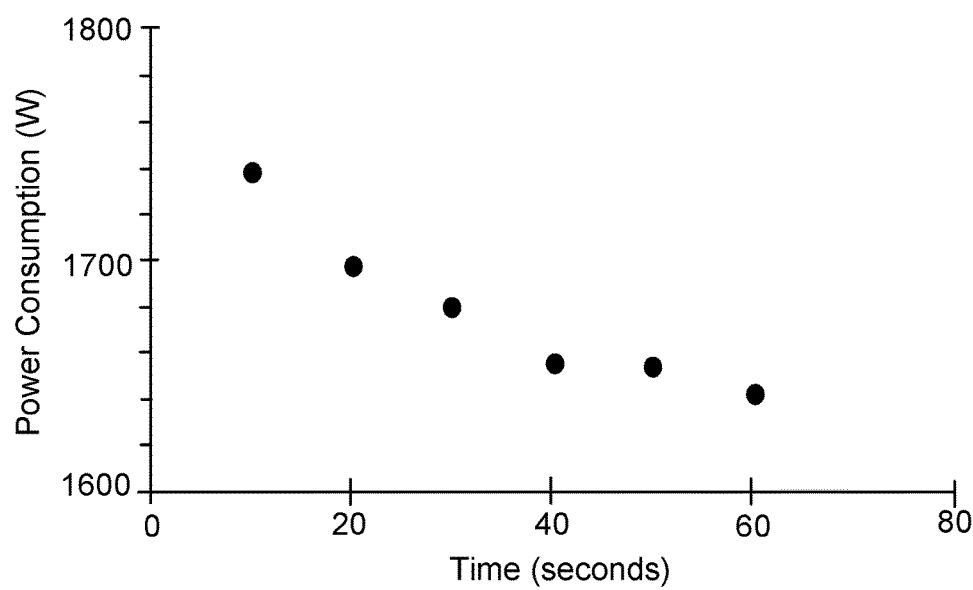
FIG. 7 show online power measurements of the microwave oven used as described in the experiments for a 60-second exposure.

For 1% w/w MWCNT-1, increasing the microwave irradiation time from 15 seconds to 30 and 60 seconds increased TPH removal from 20% to 30% and 60%, respectively, as shown in FIG. 6. Longer irradiation times increased the temperature due to the increase in the specific energy input. FIG. 7 shows online power measurements of the microwave oven for a 60-second exposure. An average of 1678 W power input from the microwave introduced 0.007 kWh (i.e., 24.2 kJ) energy in 15 seconds, whereas increasing the irradiation time to 30 and 60 seconds increased the energy input to 0.013 kWh and 0.027 kWh, which yields to 2.7 and 5.4 kWh/kg soil, respectively.

Figure 8:
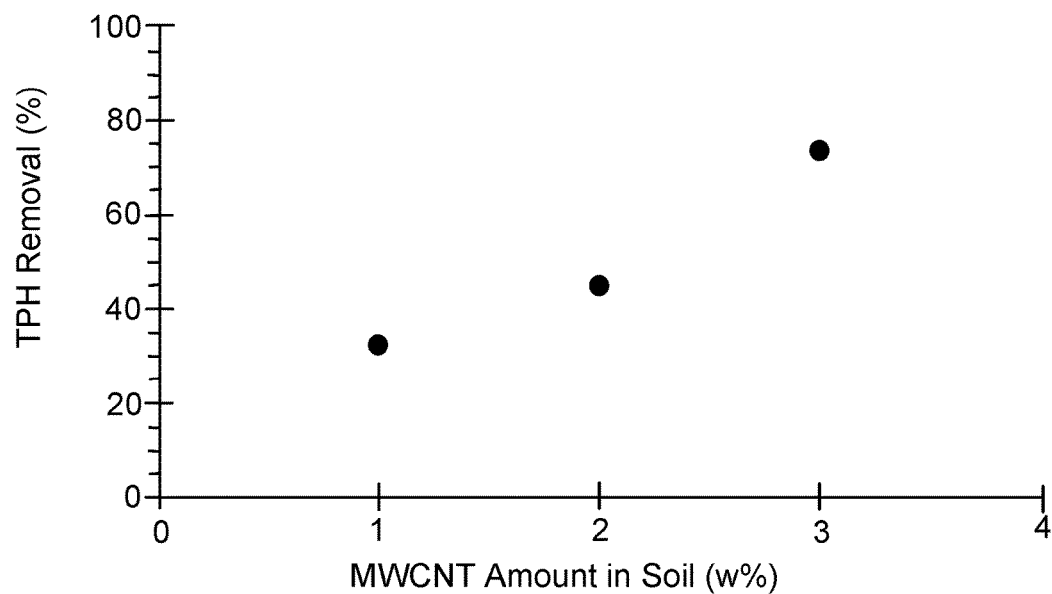
FIG. 8 shows the effect of dielectric additive amount on TPH removal for 30-second microwave irradiation.

Higher concentrations of dielectric additives may allow more contact with soil due to abundance of additive mass, resulting in more heating during irradiation. FIG. 8 shows the effect of dielectric additive (MWCNT-1) amount on TPH removal. Increasing MWCNT-1 mass per unit soil from 1 wt % to 2.5% wt % and 5% wt % increased TPH removal from 35% to 45% and 70%, respectively. Thirty-second microwave irradiation was applied to all samples.

Figure 9:
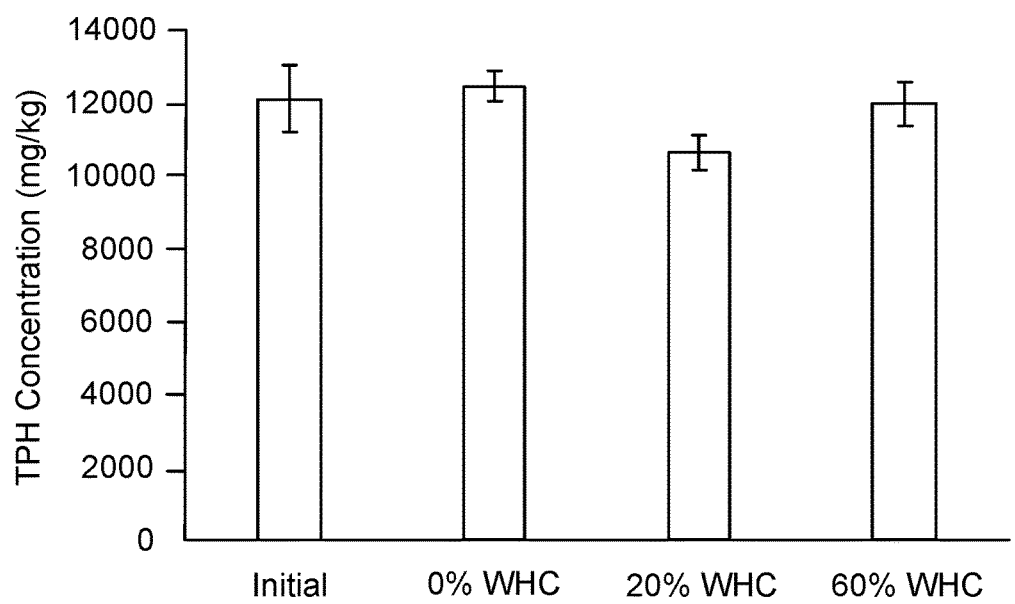
FIG. 9 shows the effect of moisture content on TPH removal after 60-second microwave irradiation with a dielectric additive.

Soil moisture content is also considered to be an operational parameter, because water has a high dielectric tangent loss and can contribute to microwave heating and stripping of hydrocarbons during evaporation; conversely, it can serve as a heat sink and decrease the soil temperature. FIG. 9 shows the effect of moisture content, reported as soil water holding capacity (WHC), on TPH removal after 60 second microwave irradiation with MWCNT-2 as the additive. Error bars indicate standard deviation of triplicate experiments. TPH removal was not notably different when microwave heating was applied to soils at 0, 20, and 60% of the soil water holding capacity.

Microwave-Enabled Thermal Treatment of Bioremediated Soils with Additives.

Figure 10:
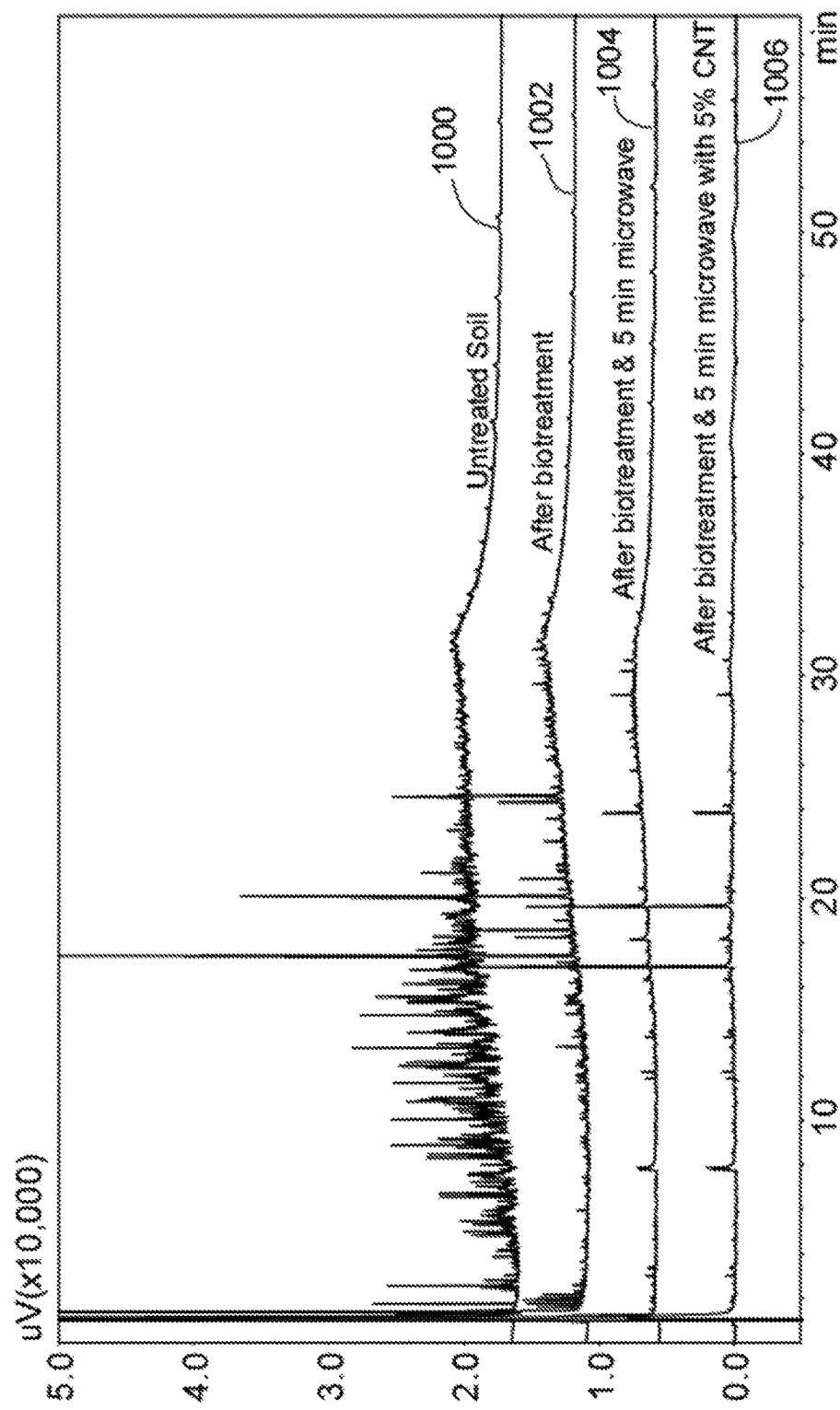
FIG. 10 shows chromatograms of TPH-containing soils after biotreatment and consecutive microwave treatment with and without carbon nanotubes.

Bioremediation is a common low-cost strategy to remove a portion of TPH from contaminated soils, but a non-biodegradable TPH fraction persists and causes regulatory challenges or issues associated with use or disposal of the soils. To investigate the effect of microwave irradiation on persistent components of bioremediated soils containing TPH, a bioremediated soil was exposed to five minutes of microwave irradiation. The post-treatment average TPH concentrations (±standard deviation from triplicate treatments) with and without MWCNTs were 644±230 and 2072±45 mg/kg, respectively. Adding MWCNT-1 improved TPH reduction from 17% to 74%. This substantial performance increase was attributed to the superior dielectric properties of graphitic allotropes of carbon nanotubes, confirming the ability to convert microwave radiation to conventional heat. FIG. 10 shows chromatograms of treated and untreated TPH-containing soils, including chromatograms of untreated TPH-containing soils 1000, TPH-containing soils after biotreatment 1002, TPH-containing soils after biotreatment and consecutive microwave treatment without carbon nanotubes 1004, and TPH-containing soils after biotreatment and consecutive microwave treatment with carbon nanotubes 1006. The baseline is shifted along the y-axis to allow better visual comparison. The majority of lighter TPH fractions that elute early in the gas chromatography run are removed during bioremediation, indicating that heavier, longer-chain TPH fractions are more persistent.

Adding MWCNTs in combination with microwave irradiation removed petroleum hydrocarbons, including the most recalcitrant fractions that were eluting after 30 minutes. Microwave irradiation with MWCNTs following bioremediation was capable of removing more than 90% of the TPH from impacted soil.

These results demonstrate thermal properties of dielectric carbonaceous nanomaterials and their ability to enhance the microwave-enabled thermal remediation of petroleum hydrocarbon-containing soils. Switching from macro-scale to nano-scale dielectric carbonaceous materials can shorten the irradiation times and decrease the energy intensity of the process dramatically. Additionally, some of the tested nano additives significantly increased the performance of microwave treatment of biodegraded soils containing recalcitrant petroleum hydrocarbons.

A number of embodiments have been described. Nevertheless, it will be understood that various modifications may be made without departing from the spirit and scope of the disclosure. Accordingly, other embodiments are within the scope of the following claims.

What is claimed is:

1. A soil remediation method for treating contaminated soil, the method comprising:
   providing the contaminated soil to a conveyor belt proximate a microwave radiation source;
   combining a dielectric carbonaceous nanomaterial with the contaminated soil to yield a composite contaminated soil, wherein the conveyor belt is fabricated to contain the dielectric carbonaceous nanomaterial, such that combining the dielectric carbonaceous nanomaterial with the contaminated soil comprises contacting the contaminated soil with the conveyor belt; and
   irradiating the composite contaminated soil with microwave radiation to yield a remediated soil, wherein irradiating the composite contaminated soil with the microwave radiation occurs when the composite contaminated soil is on the conveyor belt, the composite contaminated soil comprises at least 1 wt % of the dielectric carbonaceous material, and the microwave radiation provides an energy input of at least 2.5 kWh per kilogram of the composite contaminated soil.

2. The soil remediation method of claim 1, wherein the contaminated soil comprises at least 0.2 wt % of hydrocarbons having 12 to 40 carbon atoms.

3. The soil remediation method of claim 1, wherein a water content of the contaminated soil is in a range of 20 wt % to 80 wt % of the water holding capacity of the soil.

4. The soil remediation method of claim 1, wherein the composite contaminated soil comprises less than 10 wt % of the dielectric carbonaceous nanomaterial.

5. The soil remediation method of claim 1, wherein the microwave radiation has a power in a range of 500-3000 W, a frequency in a range of 300 MHz to 300 GHz, or both.

6. The soil remediation method of claim 1, wherein the microwave radiation provides an energy input of at least 5 kWh per kilogram of composite contaminated soil.

7. The soil remediation method of claim 1, further comprising irradiating the composite contaminated soil with the microwave radiation for a length of time in a range of 1 second to 900 seconds.

8. The soil remediation method of claim 1, wherein the remediated soil contains less than 2 wt % of hydrocarbons having 12 to 40 carbon atoms.

9. The soil remediation method of claim 1, wherein irradiating the composite contaminated soil with the microwave radiation increases a temperature of the composite contaminated soil to at least 150° C.

10. The soil remediation method of claim 1, wherein total petroleum hydrocarbon removal percentages in C12-C20, C20-C28, and C28-C36 carbon chain length fractions are at least 65%, at least 55%, or at least 35%, respectively.

11. The soil remediation method of claim 1, wherein total petroleum hydrocarbon removal percentages in C12-C20, C20-C28, and C28-C36 carbon chain length fractions are up to 95%, 85%, and 75%, respectively.

12. The soil remediation method of claim 1, wherein the dielectric carbonaceous nanomaterial comprises at least one of graphene, graphene oxide, carbon nanotubes, carbon nanofibers, and superfine powdered activated carbon.

* * * * *